US008688249B2

(12) United States Patent
Vernon

(10) Patent No.: US 8,688,249 B2
(45) Date of Patent: *Apr. 1, 2014

(54) PROCESSING AUDIO INPUT SIGNALS

(75) Inventor: Christopher David Vernon, Beverley (GB)

(73) Assignee: Sonita Logic Limted, Sheffield (GB)

( * ) Notice: Subject to any disclaimer, the term of this patent is extended or adjusted under 35 U.S.C. 154(b) by 1479 days.

This patent is subject to a terminal disclaimer.

(21) Appl. No.: 11/787,937

(22) Filed: Apr. 18, 2007

(65) Prior Publication Data

US 2007/0253555 A1 Nov. 1, 2007

(30) Foreign Application Priority Data

Aug. 23, 2006 (GB) .................................. 0616677.1

(51) Int. Cl.
*G06F 17/00* (2006.01)

(52) U.S. Cl.
USPC ................................ 700/94; 381/61; 381/63

(58) Field of Classification Search
USPC ........................................ 700/94; 381/61, 63
See application file for complete search history.

(56) References Cited

U.S. PATENT DOCUMENTS

| | | | | |
|---|---|---|---|---|
| 5,208,860 | A | 5/1993 | Lowe et al. | |
| 5,544,249 | A * | 8/1996 | Opitz | 381/63 |
| 5,652,798 | A * | 7/1997 | Mizushima | 381/63 |
| 5,687,239 | A | 11/1997 | Inanaga et al. | |
| 5,729,612 | A | 3/1998 | Abel et al. | |
| 5,761,315 | A * | 6/1998 | Iida et al. | 381/18 |
| 5,796,843 | A * | 8/1998 | Inanaga et al. | 381/17 |
| 6,118,875 | A | 9/2000 | Moeller et al. | |
| 6,307,941 | B1 * | 10/2001 | Tanner et al. | 381/17 |
| 6,385,320 | B1 * | 5/2002 | Lee | 381/17 |
| 6,862,356 | B1 | 3/2005 | Makino | |
| 7,257,230 | B2 * | 8/2007 | Nagatani | 381/56 |
| 7,688,678 | B2 * | 3/2010 | Larsen et al. | 367/99 |
| 7,822,496 | B2 * | 10/2010 | Asada et al. | 700/94 |
| 2001/0038702 | A1 * | 11/2001 | Lavoie et al. | 381/307 |
| 2002/0141595 | A1 | 10/2002 | Jouppi | |
| 2004/0136538 | A1 | 7/2004 | Cohen et al. | |
| 2004/0170281 | A1 * | 9/2004 | Nelson et al. | 381/17 |
| 2004/0247134 | A1 * | 12/2004 | Miller, III | 381/19 |
| 2006/0045294 | A1 * | 3/2006 | Smyth | 381/309 |
| 2006/0050890 | A1 * | 3/2006 | Tsuhako | 381/27 |
| 2006/0222187 | A1 | 10/2006 | Jarrett et al. | |
| 2007/0061026 | A1 * | 3/2007 | Wang | 700/94 |
| 2007/0230725 | A1 * | 10/2007 | Wang | 381/309 |
| 2009/0222262 | A1 * | 9/2009 | Kim et al. | 704/231 |

FOREIGN PATENT DOCUMENTS

| | | |
|---|---|---|
| EP | 1551205 | 7/2005 |
| WO | WO 94/10816 | 5/1994 |

OTHER PUBLICATIONS

Trading Spaces: Electronic Musician Magazin article:Nov. 23, 2004.*

* cited by examiner

*Primary Examiner* — Paul McCord
(74) *Attorney, Agent, or Firm* — James Creighton Wray

(57) ABSTRACT

A method of reproducing a stereo output signal (having a left field and a right field) represented as digital samples such that said stereo signal emulates the production of said audio signal from a specified audio source location relative to a listening source location (an indicated location). A left channel signal is produced by convolving an audio input signal with a broadband response file, selected from a plurality of stored files derived from empirical testing, dependant upon the indicated location. A right channel signal is also produced in this way. The left and right channel signals are each duplicated for playing through each of a plurality of displaced left field loudspeakers and displaced left field loudspeakers displaced right field loudspeakers respectively. Apparatus for reproducing a stereo output signal. A data storage facility having a stereo output signal.

16 Claims, 28 Drawing Sheets

RECORDED SAMPLE R

TEST POSITION L

| | | |
|---|---|---|
| L1 | R A1 | R O1 |
| L2 | R A2 | R O2 |
| L3 | R A3 | R O3 |
| L4 | R A4 | R O4 |
| L5 | R A5 | R O5 |
| L6 | R A6 | R O6 |
| L7 | R A7 | R O7 |

*Fig. 12*

$$h = f * g$$

1401 h = A recorded signal f = A first signal

* = Mathematical convolution operator g = A second signal

*Fig. 14*

BROADBAND RESPONSE FILE

LOCATION L

| | HUMAN SUBJECT | BRICK | GRASS | |
|---|---|---|---|---|
| L1 | B1 | B1B | B1G | |
| L2 | B2 | B2B | B2G | |
| L3 | B3 | B3B | B3G | |
| L4 | B4 | B4B | B4G | |
| L5 | B5 | B5B | B5G | |
| L6 | B6 | B6B | B6G | |
| L7 | B7 | B7B | B7G | |
| | | | | |

Fig. 22

PROCESSING AUDIO INPUT SIGNALS

CROSS REFERENCE TO RELATED APPLICATIONS

This application claims priority from United Kingdom Patent Application No. 06 07 707.7, filed Apr. 19, 2006, and United Kingdom Patent Application No. 06 16 677.1, filed Aug. 23, 2006, the entire disclosures of which are incorporated herein by reference in their entirety.

TECHNICAL FIELD

The present invention relates to a method of processing audio input signals represented as digital samples to produce a stereo output signal having a left field and a right field. The invention also relates to apparatus for processing an audio input signal and a data storage facility having a plurality of broadband response files stored therein.

BACKGROUND OF THE INVENTION

Attempts have been made to process audio input signals so as to place them in a perceived three-dimensional sound space. It has been assumed that to place a sound behind a subject for example, that this would require a source of sound (i.e. a loudspeaker) to be placed behind a subject. This logically implies that for three-dimensional sound to exist, complex speaker systems must be created with loudspeakers above and below the plane of the ears of the listener. Clearly, this is not a satisfactory solution, even for highly specified cinemas for example and therefore practical deployment of such systems has only existed in extreme environments with very specialised venues.

Models have been constructed based upon attempting to hear what the ears hear. For example, experimentation has been performed using a standard dummy head in which the head has microphones mounted where each ear canal would normally sit. Experimentation has then been conducted in which many samples may be made of sounds from many positions. From this, it was possible to produce a head related transfer function, which is then in turn used to process sounds as though they had originated from certain desired positions. However, to date, the results have been less than ideal.

BRIEF SUMMARY OF THE INVENTION

According to an aspect of the present invention, there is provided a method of reproducing a stereo output signal (having a left field and a right field) represented as digital samples such that said stereo signal emulates the production of said audio signal from a specified audio source location relative to a listening source location (an indicated location), comprising the steps of: receiving a left channel signal produced by convolving an audio input signal with a broadband response file for a left field (a selected left field response file) selected from a plurality of stored files derived from empirical testing, dependent upon said indicated location; receiving a right channel signal produced by convolving an audio input signal with a broadband response file for a right field (a selected right field response file) selected from a plurality of stored files derived from empirical testing, dependant upon said indicated location; playing said left channel signal through each of a plurality of displaced left field loudspeakers, and playing said right channel signal through each of a plurality of displaced right field loudspeakers.

According to a further aspect of the present invention, there is provided apparatus for reproducing a stereo output signal (having a left field and a right field) represented as digital samples such that said stereo signal emulates the production of said audio signal from a specified audio source location relative to a listening source location (an indicated location), comprising: a first input device for receiving a left channel signal produced by convolving an audio input signal with a broadband response file for a left field (a selected left field response file) selected from a plurality of stored files derived from empirical testing, dependant upon said indicated location; a second input device for receiving a right channel signal produced by convolving an audio input signal with a broadband response file for a right field (a selected right field response file) selected from a plurality of stored files derived from empirical testing, dependant upon said indicated location; and a processing device configured to: distribute said left channel signal for playing through each of a plurality of displaced loudspeakers, and distribute said right channel signal for playing through each of a plurality of displaced loudspeakers.

According to a second further aspect of the present invention, there is provided a data storage facility having a stereo output signal (having a left field and a right field) represented as digital samples such that said stereo signal emulates the production of said audio signal from a specified audio source location relative to a listening source location (an indicated location), in which a left channel signal has been produced by convolving an audio input signal with a broadband response file for a left field (a selected left field response file) selected from a plurality of stored files derived from empirical testing, dependant upon said indicated location; and a right channel signal has been produced by convolving an audio input signal with a broadband response file for a right field (a selected right field response file) selected from a plurality of stored files derived from empirical testing, dependant upon said indicated location.

BRIEF DESCRIPTION OF THE SEVERAL VIEWS OF THE DRAWINGS

FIG. 12 shows the storage of recorded test input samples;

FIG. 14 shows a convolution equation;

FIG. 22 shows the storage of broadband response files;

DESCRIPTION OF THE BEST MODE FOR CARRYING OUT THE INVENTION

FIG. 1

Figure 1:
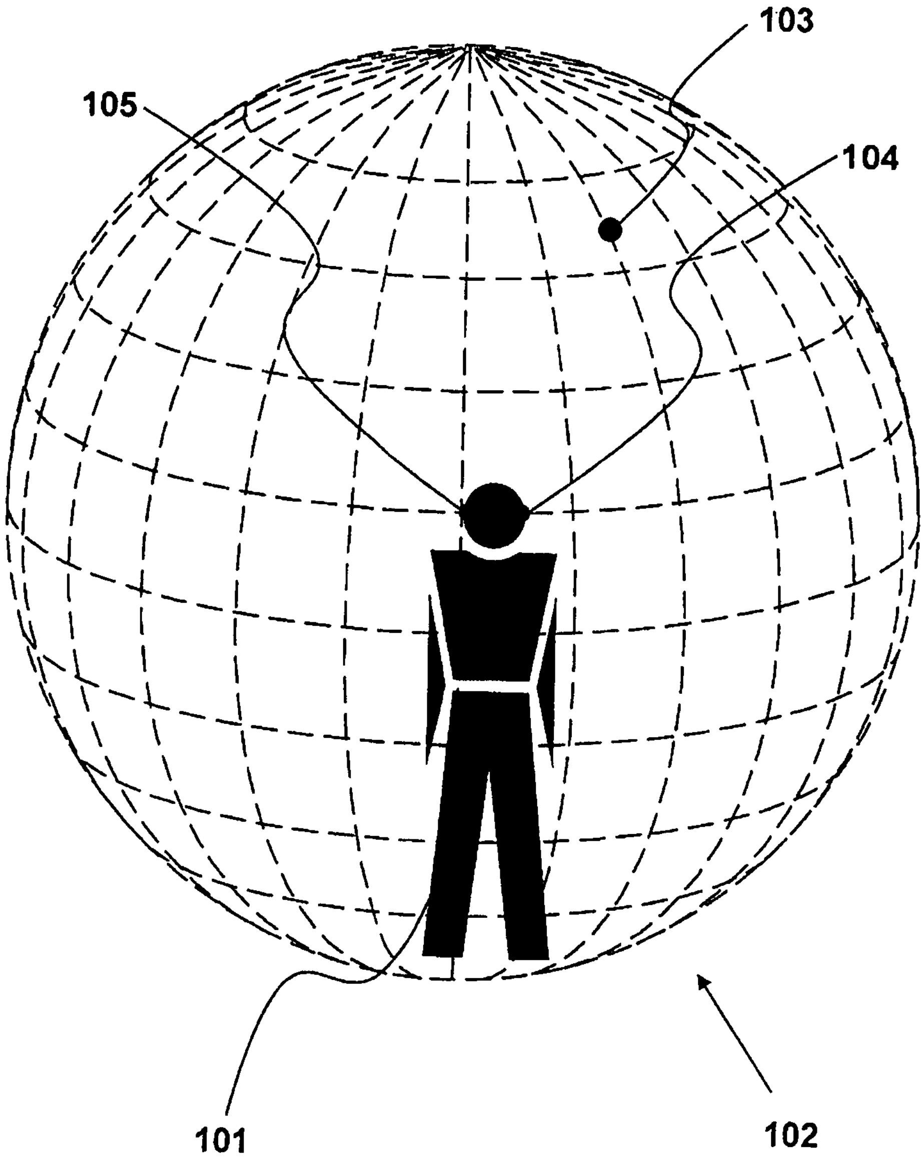
FIG. 1 shows a diagrammatic representation of a human subject.

FIG. 1 shows a diagrammatic representation of a human subject 101.

The human subject 101 is shown surrounded by a notional three-dimensional originating region 102. An audio output may originate from a location, such as location 103, relative to the human subject 101. The left ear 104 and the right ear 105 of the human subject 101 may then receive the audio output. The inputs received by the left ear 104 and by the right ear 105 are subsequently processed in the brain of the human subject 101 to the effect that the human subject 101 perceives an origin of the audio output.

It is desirable to receive an audio input signal represented as digital samples and to produce a stereo output signal having a left field and a right field in such a way that the stereo signal emulates the production of the audio signal from an originating position relative to the position of the human being.

As described below, it is possible for a stereo signal, producing a left field and a right field, to emulate the generation of a sound source from a location relative to a listening source location.

It is to be appreciated that whilst listening to sound from a particular audio source location, the perspective of the left ear 104 of the human subject 101 is different to the perspective of the right ear 105 of the human subject 101. The brain of the human subject 101 processes the left perspective in combination with the right perspective to the effect that the perception of an origin of the audio output includes a perception of the distance of the audio source from the listening location in addition to relative bearings of the audio source.

With reference to the notional originating region 102, a sound originating position is defined by three co-ordinates based upon an origin at the centre of the region 102, which in the diagrammatic representation of FIG. 1 is the right ear 105 of the human subject 101. From this origin, locations are defined in terms of a radial distance from the origin, leading to the notional generation of a sphere, such as the spherical shape of notional region 102, and with respect to two angles defined with respect to a plane intercepting the origin. Thus, a plurality of co-ordinate locations, such as location 103, on originating region 102 may be defined.

In a specific embodiment, at least seven hundred and seventy (770) locations are defined. For each of these locations, a broadband response file is stored.

When emulating an audio signal from a specified audio source location relative to a listening source location, a broadband response is selected dependent upon the relative audio source and listening source locations for each of a left field and a right field. Thereafter, each selected broadband response file is processed in combination with an audio input file by a process of convolution to produce left and right field outputs. A resulting stereo output signal will reproduce the audio input signal from the perspective of the listening location as if it had originated substantially from the indicated audio source location.

FIG. 2

Figure 2:
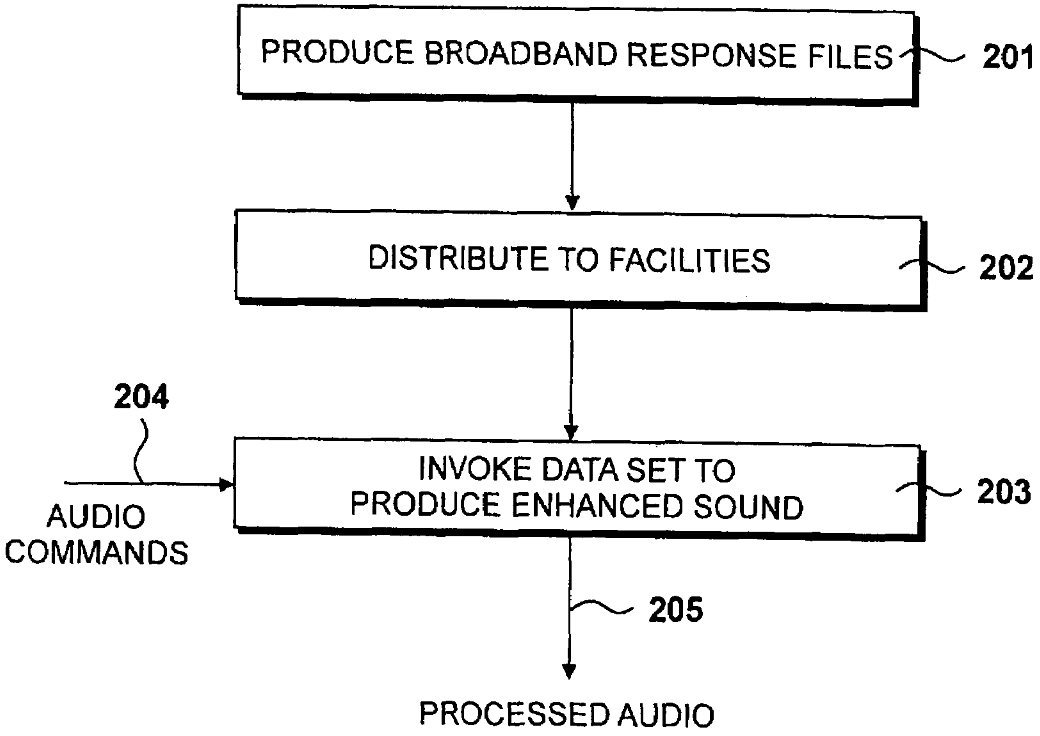
FIG. 2 outlines a practical environment in which audio processing procedures described with reference to FIG. 1 can be deployed.

A practical environment in which audio processing procedures described with reference to FIG. 1 can be deployed is outlined in FIG. 2.

At step 201 broadband response files are derived from empirical testing involving the use of at least one human subject. At step 202 the broadband response files are distributed to facilities such that they may then be used in the creation of three-dimensional sound effects. This approach may be used in many different types of facilities. For example, the approach may be used in sound recording applications, such as that described with respect to FIG. 24. Similarly, the techniques may be used for audio tracks in cinematographic film production as described with respect to FIG. 25. Furthermore, the techniques may be used for computer games, as described with respect to FIG. 26. It should also be appreciated that these applications are not exhaustive.

At step 203 the data set is invoked in order to produce the enhanced sounds. Thus, at step 203 audio input commands are received at 204 and the processed audio output is produced at 205.

FIG. 3

Figure 3:
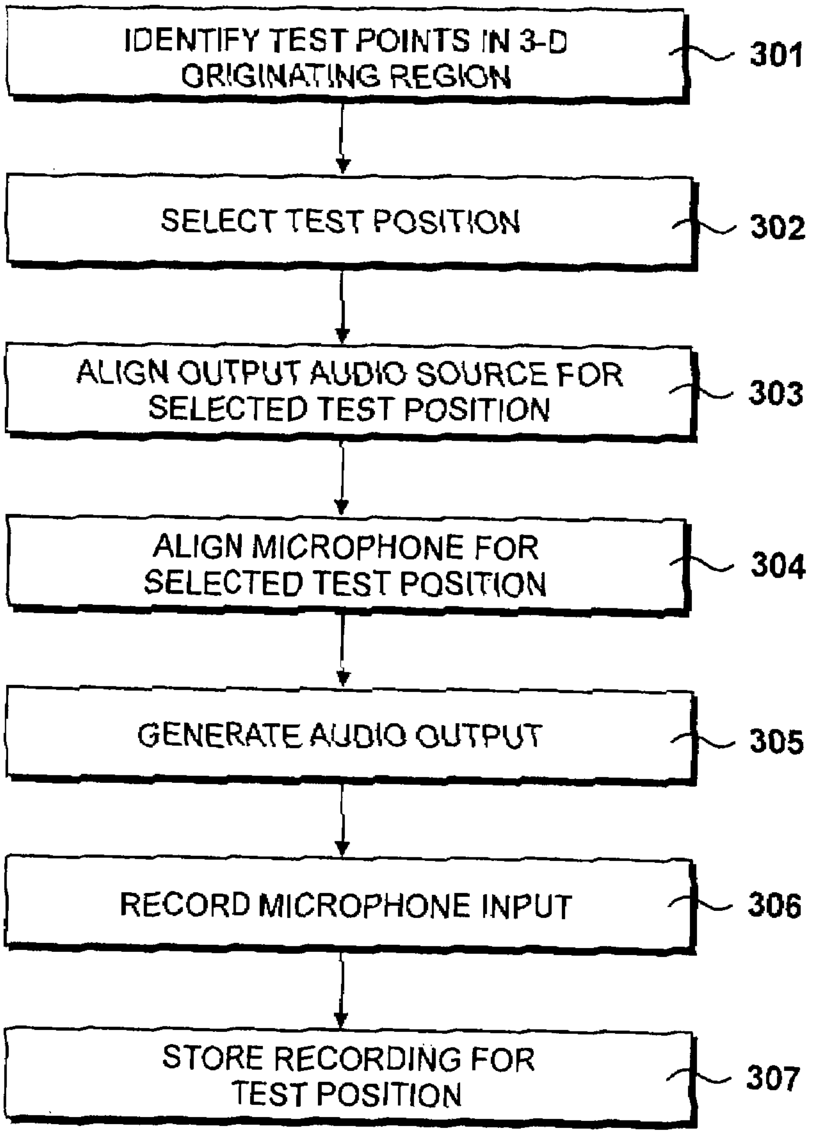
FIG. 3 shows an overview of procedures performed to produce a broadband response file.

An overview of procedures performed to produce each broadband response file is shown in FIG. 3.

At step 301, test points about a three-dimensional originating region are identified. The number of test points is determined and the position of each test point relative to the centre of the originating region is determined.

A test position is selected at step 302. A test position relates to the relative positioning and orientation between an audio output point and a listening point.

At step 303 an audio output source is aligned for the test position selected at step 302. The audio output source is located at the test point associated with the selected test position.

At step 304, a microphone is aligned for the test position selected at step 302. The microphone is located at the recording point associated with the selected test position. An audio output from the aligned audio output source is generated at step 305 and the resultant microphone output is recorded at step 306. At step 307, the recorded signal is stored as a file for the selected test position.

Steps 302 to 307 may then be repeated for each test position.

For each selected test position, a plurality of sounds may be generated by the sound source such that the resulting signals recorded at the recording position relate to a range of frequencies.

In a specific embodiment, a human subject is located in an anechoic chamber and an omnidirectional microphone is located just outside an ear canal of the human subject, in contact with the side of the head. A set of sounds is generated and the microphone output is recorded for each of the plurality of test positions to produce a set of test recordings. In a specific embodiment, the human subject is aligned at an azimuth position and recordings are taken for each elevation position before the human subject is aligned for a next azimuth position.

Optionally, the microphone is located in the anechoic chamber absent the human subject, the same set of sounds is generated and the microphone output is recorded for each of the plurality of test positions to produce a set of reference recordings.

An originating signal derived from the microphone output recordings is then deconvolved with each of the set of reference signals to produce a broadband response file for each test position.

In this way, it is possible to produce a set of frequency resolved broadband signals for each of a large number of locations around a three-dimensional region surrounding a subject.

Each broadband response file is then made available to be convolved with an audio input signal so as to produce a mono signal for a left field and for a right field. Thus, for a human subject, the left and right fields of the stereo signal represent the audio input signal as if originating from a specified location relative to the human head from the respective perspectives of the left ear and the right ear.

It is appreciated that many complex effects are present that provide cues allowing a subject to identify the location of a sound. In the preferred embodiment, the information has been recorded empirically without a requirement to produce complex mathematical models which, to date, have been unsuccessful in terms of reproducing these three-dimensional cues.

Compared to using artificial head systems, it is appreciated that the head itself is not a homogeneous mass. Sound transmitted through the flesh and bone structure of the head and also around the head provides significant information in addition to the sound travelling directly through the air.

In order to provide further cues to the identification of three-dimensional position, it is also appreciated that high frequencies, that are above 20 kilohertz, also play their part, although not directly audible. It is therefore preferable for broadband microphones to be used and for frequencies to be generated over the notional audible range and to continue up to, for example, 96 kilohertz. Again, studies have shown that frequencies normally considered as being beyond the established human hearing range are of importance when giving quality to the sound and thereby facilitate the positioning of the sound. It is understood that these frequencies are transmitted via bone conduction rendering them perceptible by organs other than those (essentially the cochlea) responsible for hearing in the established range of 20 hertz to 20 kilohertz.

Given the symmetrical nature of the human hearing response, it is not entirely necessary to provide sound recording with respect to both ears, given that the recordings achieved from one side may be reflected and reused on the alternative side. Thus, each recorded sample may effectively be deployed with respect to two originating locations.

A second microphone may be provided to facilitate the recording of the otoacoustic response of the human subject by using a specialist microphone in the appropriate ear. As is known, otoacoustics have been used for many years to test the hearing of babies and young children. When a sound is played to the human eardrum it creates a sympathetic sound in response. Otoacoustic microphones are designed to detect these sounds and it is understood that otoacoustics may also have a significant bearing on the advanced interpretation or cueing of sound.

FIG. 4

Figure 4:
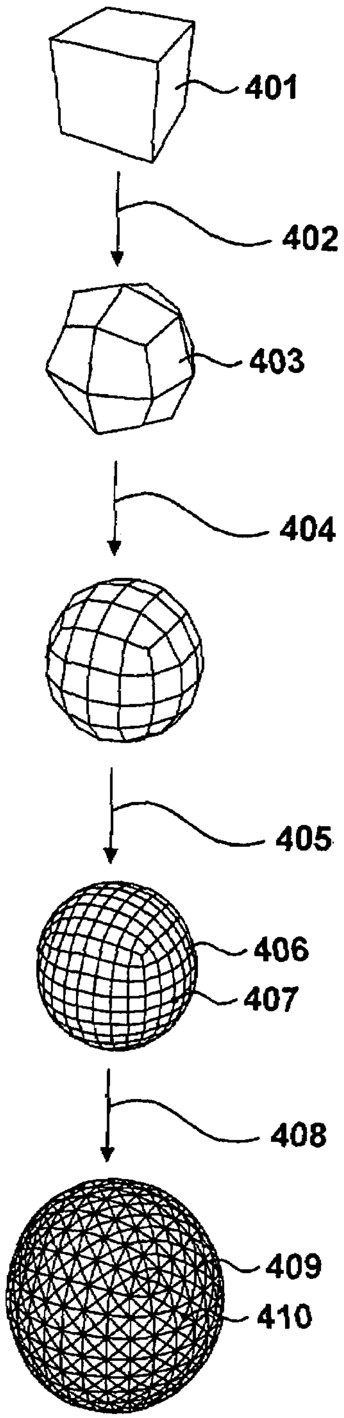
FIG. 4 illustrates steps to establish test points on an originating region according to a specific embodiment.

Steps to establish test points on an originating region according to a specific embodiment are illustrated in FIG. 4.

A cube 401 is selected as a geometric starting point. As indicated by arrow 402, the cube 401 is subdivided using a subdivision surface algorithm. In a specific embodiment, a quad-based exponential method is used.

Following a first step of subdivision of cube 401, a polygon 403 is obtained providing 26 vertices. As indicated by arrows 404 and 405, this process is repeated twice, giving a polygon 406 providing 285 vertices, such as vertex 407. The quadrilateral sides of polygon 406 are then triangulated by adding a point at the centre of each side, as indicated by arrow 408. This results in a polygon 409 providing seven hundred and seventy (770) points, such as point 410. It can be seen from FIG. 4 that each step produces a polygon that more closely approximates a sphere.

Polygon 407 is considered to approximate a spherical originating region and each of the seven hundred and seventy (770) points about polygon 407 is to be used as a test point.

The resultant distribution of the test points about polygon 407 is found to be practical. The subdivision surface method used serves to increase the evenness of distribution of points about a spherical polygon and reduce the concentration of points at the poles thereof. Further, the test points introduced through triangulation of the quadrilateral sides of polygon 407 serve to reduce the distance of each path between points across each quadrilateral side. These features serve to increase the uniformity of the paths between points around the originating region.

By empirical testing, seven hundred and seventy (770) locations would appear to be consistent with the spatial resolution of human hearing. However, the greater the number of locations used, the smoother the tonality changes between originating locations. Hence, an increased number of locations may be used to reduce the incidence of tonal irregularities that may be identified by a listener as processed sound moves between emulated locations. Thus, in some applications, a thousand or several thousand locations may be derived and employed.

FIG. 5

Figure 5:
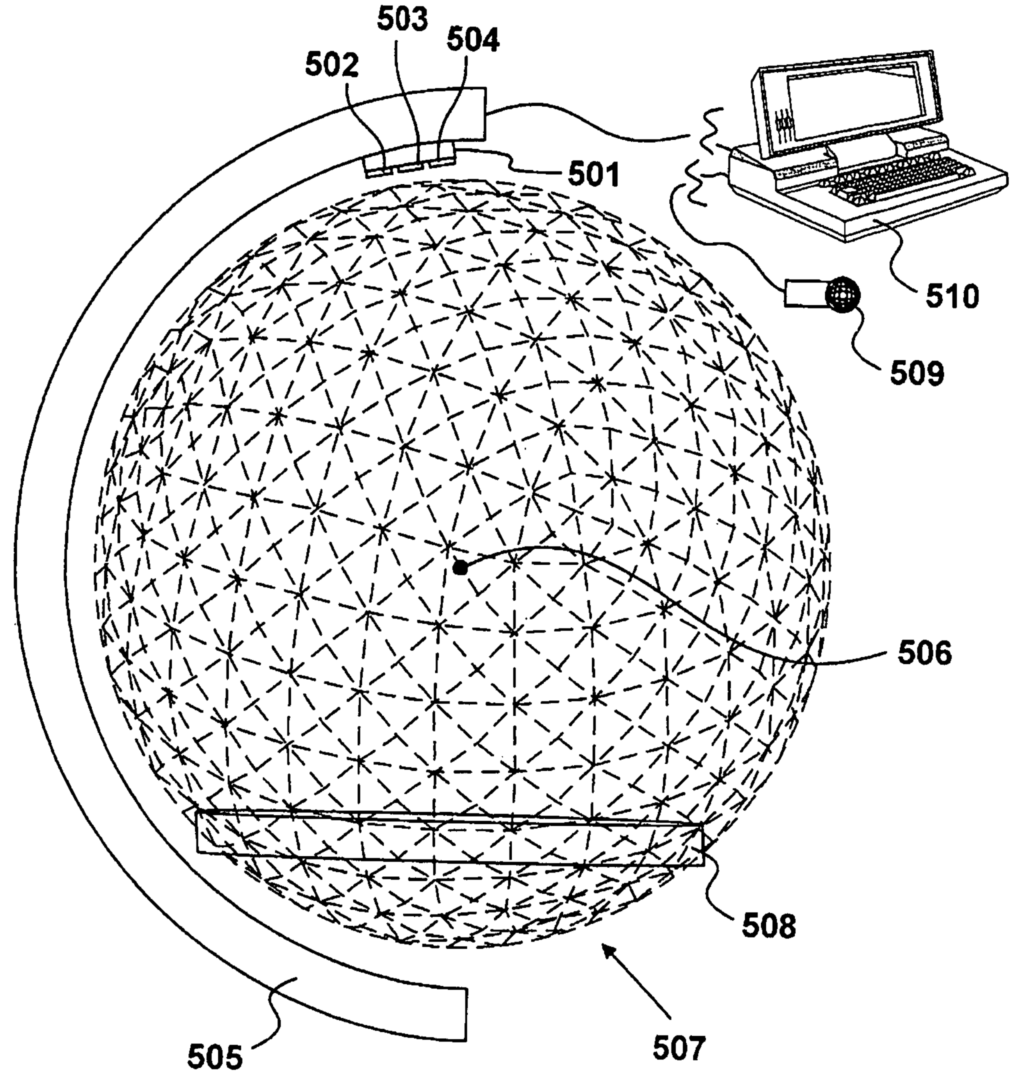
FIG. 5 illustrates apparatus for use in the production of broadband response files.

Apparatus for use in the production of broadband response files is illustrated in FIG. 5. The apparatus enables test positions over three hundred and sixty (360) degrees in both elevation and azimuth to be reproduced.

A loudspeaker unit 501 is selected that is capable of playing high quality audio signals over the frequency range of interest; in a specific embodiment, up to 80 kilohertz. In a specific embodiment, the loudspeaker includes a first woofer speaker 502 for bass frequencies, a second tweeter speaker 503 for treble frequencies, and a third super tweeter speaker 504 for ultrasonic frequencies.

The loudspeaker unit 501 is supported in a gantry 505. The gantry 505 provides an arc along which the loudspeaker is movable. The arrangement of the loudspeaker unit 501 and gantry 505 is such that the sound emitted from the loudspeakers 502, 503, 504 is convergent at the centre 506 of the arc of the gantry 505. The centre 506 of the arc is determined as the centre of originating region 507. The emitted sound from the loudspeakers is time aligned such that the sounds are synchronised at the convergence point.

In a specific embodiment, the radius of the arc of the gantry 505 is 2.2 (two point two) m. The gantry 507 defines restraining points along the length thereof to allow the loudspeaker unit 501 to be supported at different angles of elevation between plus ninety (+90) degrees above the centre 506, zero (0) degrees level with the centre 506 and minus ninety (−90) degrees below the centre 506.

A platform 508 is provided to assist at least one microphone, such as audio microphone 509, to be supported at the centre 506 of the arc. As previously described, an otoacoustic microphone may additionally be used. Alternatively, a single microphone apparatus may be used for both audio and otoacoustic inputs.

The platform 508 has a mesh structure to allow sounds to pass therethrough. The platform 508 is arranged to support a human subject with the audio microphone located in an ear of the human subject. In addition, the platform is arranged to optionally support a microphone stand that in turn supports the audio microphone.

In order to reduce resonance and noise from the apparatus, insulating material may be used. For example, the gantry 505 and the platform 508 may be treated with noise control paint and/or foam to inhibit acoustic reflections and structure resonance. The desired effect is to contain sound in the vicinity of physical surfaces at which the sound is incident.

A computer system 510, a high-powered laptop computer being used in this embodiment, is also provided.

Output signals to the loudspeaker unit 501 are supplied by the computer system 510, while output signals received from the at least one microphone 509 are supplied to the computer system 510.

FIG. 6

Figure 6:
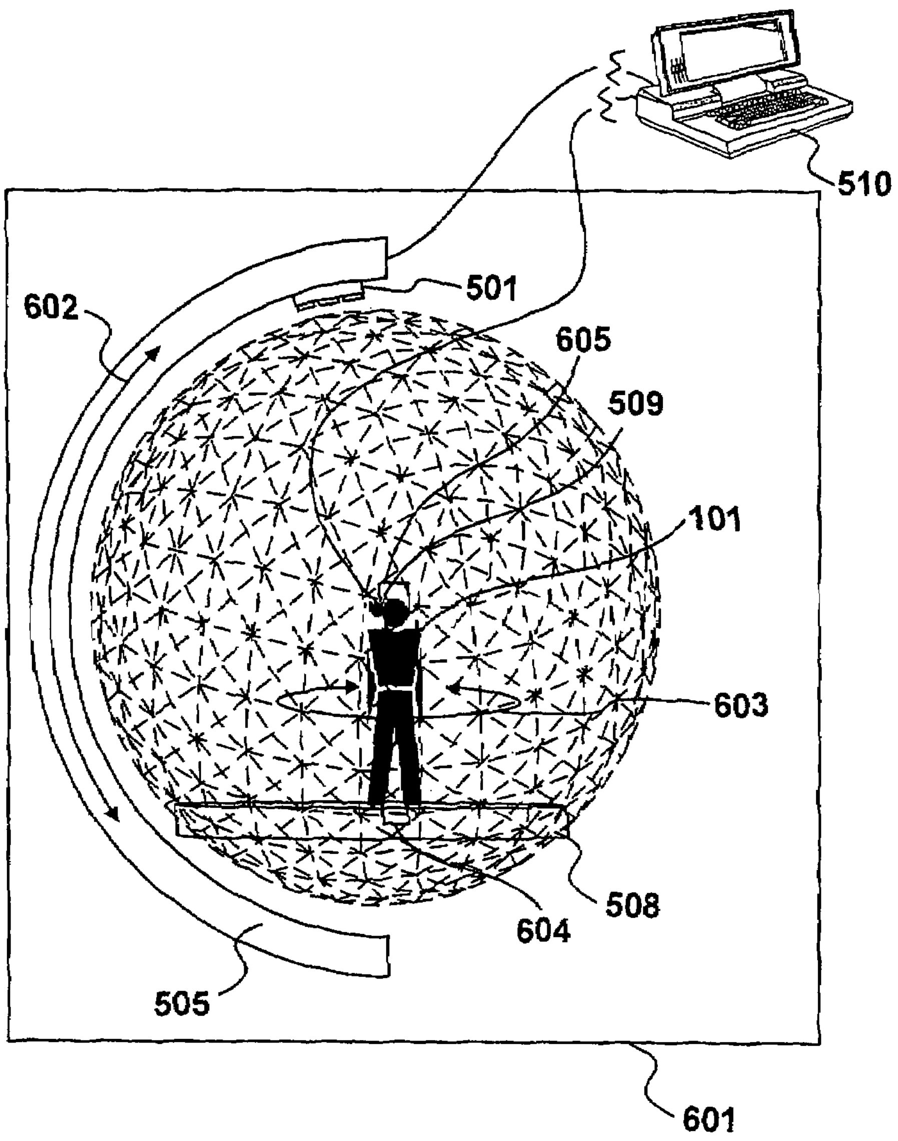
FIG. 6 illustrates use of the apparatus of FIG. 5 to produce a first set of data for the production of broadband response files.

Use of the apparatus of FIG. 5 to produce a first set of data for the production of broadband response files is illustrated in FIG. 6.

The apparatus is placed inside an anechoic acoustic chamber 601 along with human subject 101. Microphone 509, which in this embodiment is a contact transducer, is placed in the pinna (also known as the auricle or outer ear), adjacent the ear canal, of one ear, in this example the right ear of the human subject 101. The human subject 101 and the platform 508 are arranged such that an ear (right ear) of the human subject 101 and hence the microphone 509 is located at the centre of the arc of the gantry 505. Steps 302 to 307 of FIG. 3 are repeated to produce a plurality of reference recordings.

To reproduce each test point, the loudspeaker unit 501 is movable in elevation, as indicated by arrow 602, and the human subject 101 is movable in azimuth, as indicated by arrow 603.

A first test position is selected. The particular position sought on the first iteration is not relevant to the overall process although a particular starting point and trajectory may be preferred in order to minimise movement of the apparatus.

For the selected test position, the human subject 101 is aligned on the platform 508 and the loudspeaker unit 501 is aligned relative to the human subject 602. Alignment may be facilitated by the use of at least one laser pointer. In a specific embodiment, at least one laser pointer is mounted upon the loudspeaker unit 501 to assist accurate alignment.

Once aligned, an audio output from the loudspeaker unit 501 is generated at step 305 and the resultant input received by the microphone 509 is recorded. The recorded signal is stored as a reference recording for the selected test position.

This process is repeated for the relevant degrees of elevation or degrees of elevation and degrees of azimuth.

The number of test positions selected for reference recordings may vary according to the particular audio microphone used. Preferably, the audio microphone is omnidirectional with a high-resolution impulse response.

In this way, a first set of data is produced that is stored as a first set of reference recordings.

As previously described, a second otoacoustic input may also be used. In a specific application, an otoacoustic microphone is placed in the same ear (right ear) of the human subject 101 and the input received by the otoacoustic microphone is recorded in addition to that received by audio microphone 509. In this way, first and second sets of data are produced that are stored as a first set and a second set of reference recordings.

In a specific embodiment, movement of the loudspeaker unit 501 is controlled by high quality servomotors, which in turn receive commands from the computer system 510. Alternatively, the loudspeaker unit 501 may be moved manually. Thus, the restraining points of the gantry 505 may be pinholes and a pin may be provided to fix the loudspeaker unit 501 at a selected pinhole. It is to be appreciated that the pinholes are to be acoustically transparent.

Measuring equipment may then be used to feed signals back to the computer system 510 as to the location of the loudspeaker unit 501.

In a specific embodiment, both the gantry 505 and the platform 508 have visible demarcations of relevant degrees of elevation and azimuth respectively. It is also preferable for the human subject to maintain a uniform distance between their feet, as indicated at 604, throughout the test recordings. In a specific embodiment, the distance between the feet is equal to the distance between the ears, as indicated at 605, of the human subject 101.

FIG. 7

Figure 7:
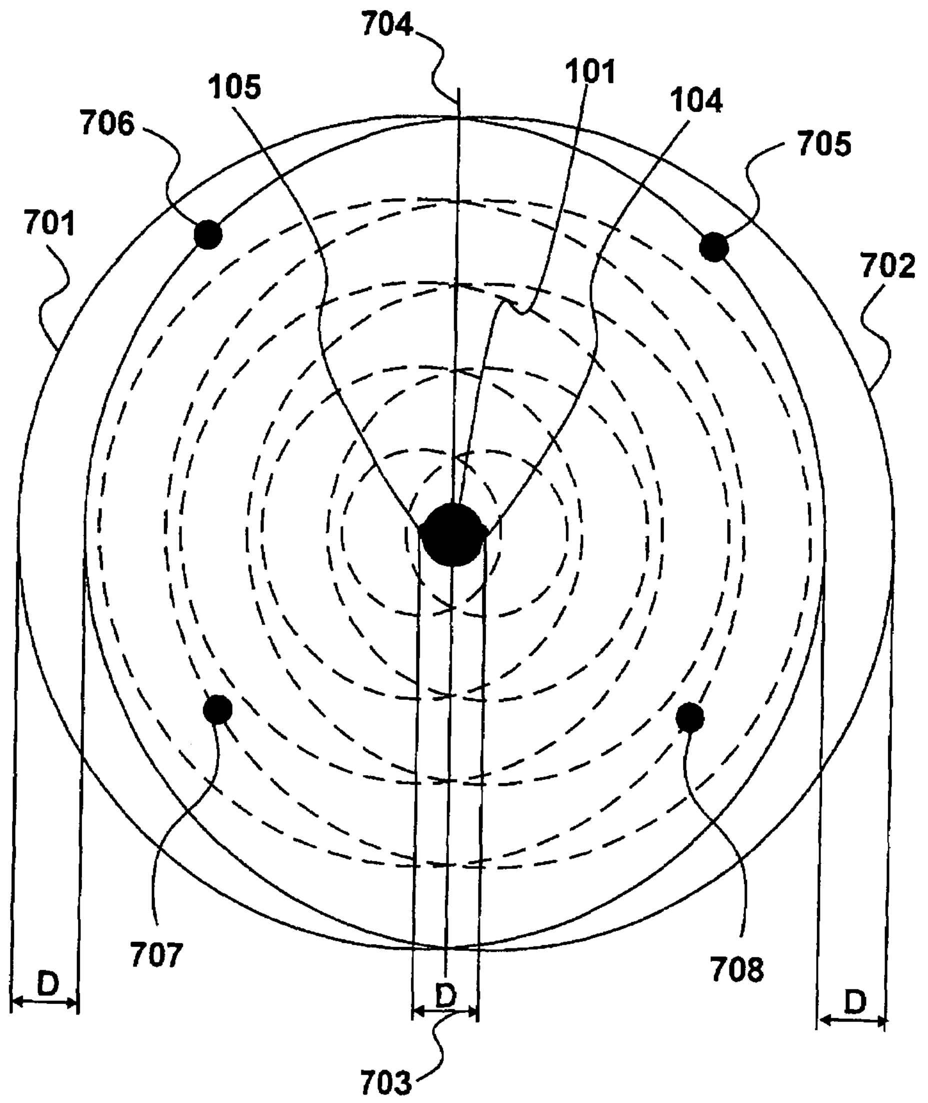
FIG. 7 illustrates use of the apparatus of FIG. 5 to produce a second set of data for the production of broadband response files.

The plan view illustration of FIG. 7 shows human subject 101 with their left ear 104 at the centre of a first spherical region 701 and their right ear 105 at the centre of a second similar spherical region 702.

A distance D, indicated at 703, exists between the left and right ears 104, 105 of the human subject 101. It can be seen that the first and second spherical regions 701, 702 overlap to the effect that the right region 701 extends distance D beyond that of the left region 702 to the right of the human subject 101 and vice versa.

As described with reference to FIG. 6, a first set of reference recordings is produced for a first ear of the human subject. Data is also stored for the other ear of the human subject, and a second set of reference recordings may be produced by repeating the empirical procedure described with reference to FIG. 6 for the other ear. Alternatively, the second set of data may be derived from the first set of data. Each item of data from the first set of reference recordings may be translated to the effect that the data is mirror imaged about the central axis, indicated at 704, extending between the left and right ears 104, 105 of human subject 101. Thus, a negative transform is applied to an item of data at a test position in one region and is stored for the test position in the other region that in azimuth is in mirror image but in elevation is the same.

Thus, data from test position 705 in the right region 701 can be reproduced as data for test position 706 in the left region 702. Similarly, data from test position 707 in the right region 701 can be reproduced as data for test position 708 in the left region 702.

FIG. 8

Figure 8:
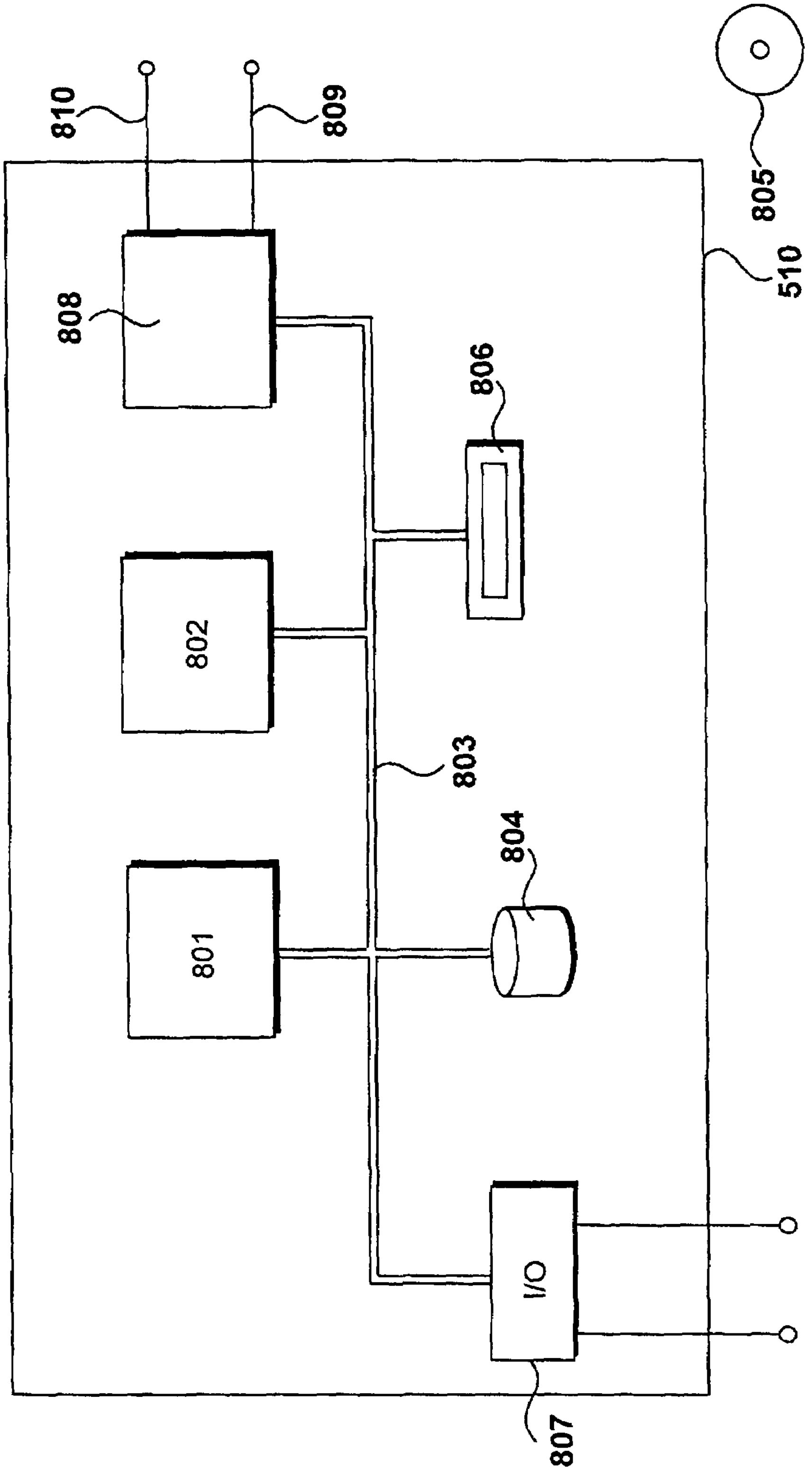
FIG. 8 illustrates a computer system identified in FIG. 5.

Computer system 510 is illustrated in FIG. 8. The system includes a central processing unit 801 and randomly accessible memory devices 802, connected via a system bus 803. Permanent storage for programs and operational data is provided by a hard disc drive 804 and program data may be loaded from a CD or DVD ROM (such as ROM 805) via an appropriate drive 806.

Input commands and output data are transferred to the computer system via an input/output circuit 807. This allows manual operation via a keyboard, mouse or similar device and allows a visual output to be generated via a visual display unit. In the example shown, these peripherals are all incorporated within the laptop computer system. In addition, the computer system is provided with a high quality sound card 808 facilitating the generation of output signals to the loudspeaker unit 501 via an output port 809, while input signals received at the at least one microphone 509 are supplied to the system via an input port 801.

FIG. 9

Figure 9:
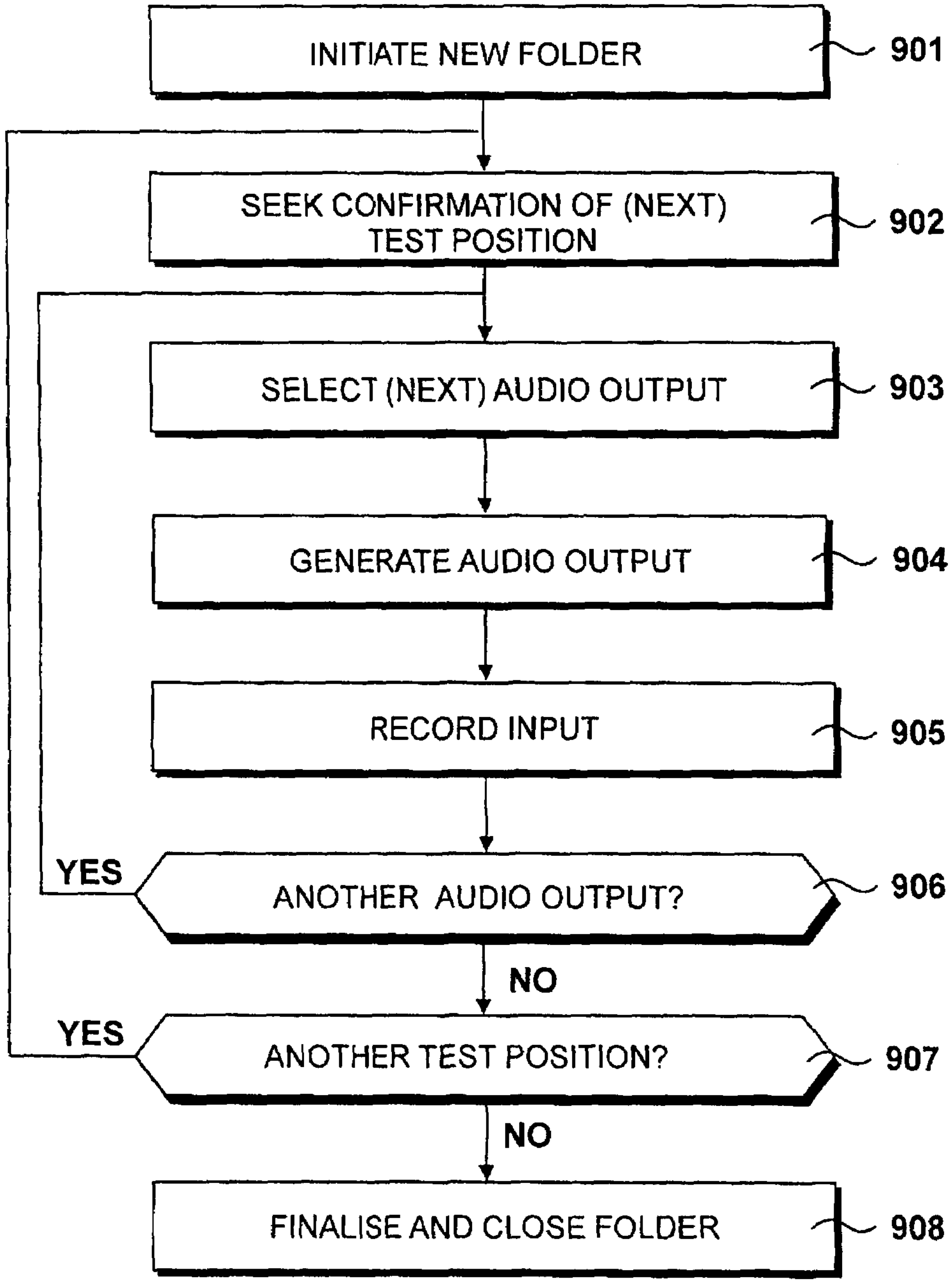
FIG. 9 shows procedures executed by the computer system of FIG. 8.

Procedures executed by the computer system 510 are detailed in FIG. 9.

At step 901 a new folder for the storage of broadband response files is initiated. In addition, temporary data structures are also established, as detailed subsequently.

At step 902 the system seeks confirmation of a first test position for which sounds are to be generated.

At step 903 an audio output is selected. For the purposes of illustration, it is assumed that the procedure is initiated with a very low frequency (20 hertz say) and then incremented, for example in 1 or 5 hertz increments, up to the highest frequency of 96 kilohertz (sampled with 192 kilohertz sampling frequency). The acoustic chamber should be anechoic across the frequency range of the audio output.

At step 904 an output sound is generated. Output sounds are generated in response to digital samples stored on hard disc drive 804. Thus, for a computer system based upon the Windows operating system, for example, these data files may be stored in the WAV format.

At step 905 and in response to the output sound being generated, the input is recorded. As previously described, this may be an audio input or both an audio input and otoacoustic input.

At step 906 a question is asked as to whether another output sound is to be played and when answered in the affirmative control is returned to 903, whereupon the next output sound is selected. Ultimately, the desired output sound or sounds will have been played for a particular test position and the question asked at step 906 will be answered in the negative.

At step 907 a question is asked as to whether another test position is to be selected and when answered in the affirmative control is returned to step 902. Again, at step 902 confirmation of the next position is sought and if another position is to be considered the frequency generation procedure is repeated. Ultimately, all of the positions will have been considered resulting in the question asked at step 907 being answered in the negative.

At step 908 operations are finalised so as to populate an appropriate data table containing broadband response files whereupon the folder initiated at step 901 is closed.

FIG. 10

As described with respect to FIG. 9, output sounds are generated at a number of frequencies. In a specific embodiment, each output sound generated takes the form of a single cycle, as illustrated in FIG. 10.

Figure 10:
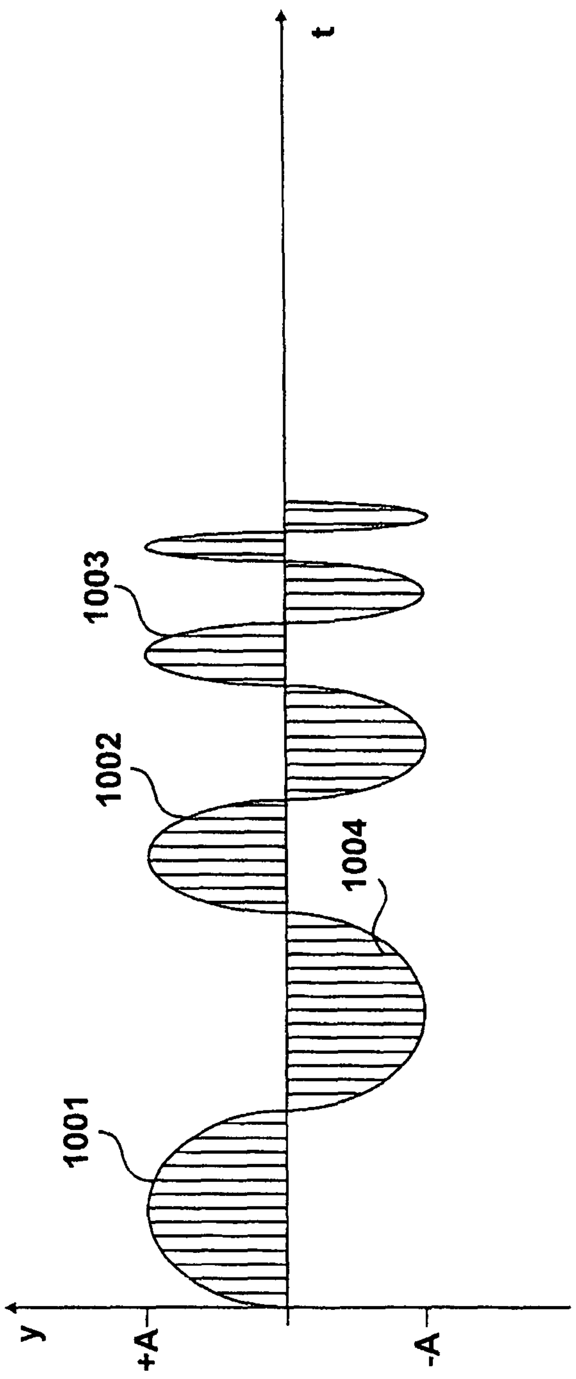
FIG. 10 illustrates the nature of generated output sounds.

In FIG. 10, 1001 represents the generation of a relatively low frequency, 1002 represents the generation of a medium frequency and 1003 represents the generation of a relatively high frequency. As can be seen from each of these examples, the output waveform takes the form of a single cycle, starting at the origin and completing a sinusoid for one period of the waveform.

It should also be appreciated that each waveform is constructed from a plurality of digital samples illustrated by vertical lines, such as line 1004. Thus, these data values are stored in each output file such that the periodic sinusoids may be generated in response to operation of the procedures described with respect to FIG. 9.

In a specific embodiment, a sequence of discrete sinusoids, with each having a greater frequency than the previous, are generated as a 'frequency sweep', a sequence that when generated is heard as a rising note. In a specific embodiment, the frequency increases in 1 Hz increments. In a specific embodiment, the frequencies of the frequency sweep have a common fixed amplitude, as illustrated in FIG. 10.

Preferably, there is no delay between sinusoids of a frequency sweep, so as to be a continuous sound, to minimise the length of the output sound. However, a delay may be provided between sinusoids if desired, and the delay may have a sufficiently short duration so as not to be identifiable by the human subject. In an alternative arrangement, the frequency may be increased during sinusoids to further reduce the duration of the output sound.

A preferred duration for the set of sounds is three (3) seconds. The duration of the set of sounds may depend upon the ability of a human subject to maintain a still posture.

The set of sounds is selected to generate acoustic stimulus across a frequency range of interest with equal energy, in a manner that improves the faithfulness of the captured impulse responses. It is found that accuracy is improved by operating the audio playback equipment to generate a single frequency at a time, as opposed to an alternative technique in which many frequencies are generated in a burst or click of noise. Using longer recordings for the deconvolution process is found to improve the resolution of the impulse response files.

The format of the set of sounds is selected to allow accurate reproducibility so as not to introduce undesired variations between plays. A digital format allows the set of sounds to be modified, for example, to add or enhance a frequency or frequencies that are difficult to reproduce with a particular arrangement of audio playback equipment.

FIG. 11

Figure 11:
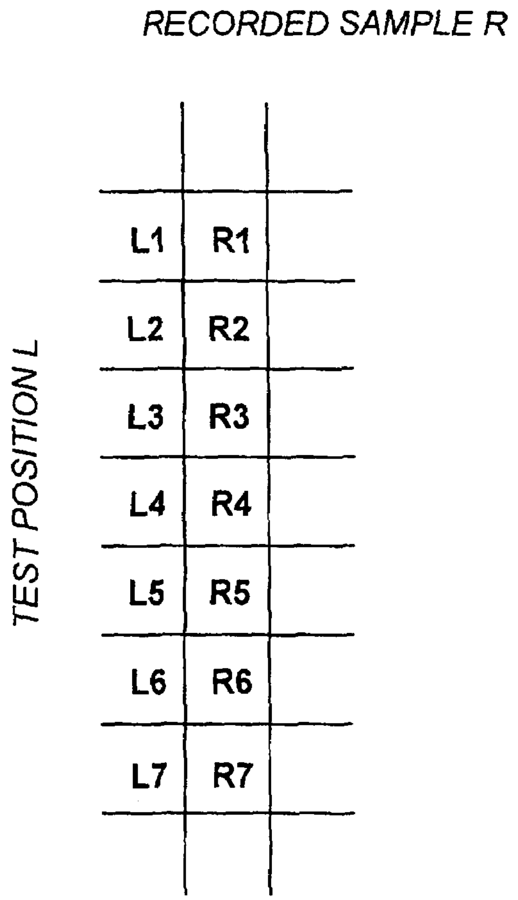
FIG. 11 shows the storage of recorded reference input samples.

As described with respect to FIG. 9, at step 901 temporary data structures are established, an example of which is shown in FIG. 11. The data structure of FIG. 11 stores each individual recorded sample for the output frequencies generated at each selected test position. In this example, audio inputs only are recorded.

In a specific embodiment, for the first test position L1 a set of output sounds is generated. This results in a sound sample R1 being recorded. The next test position L2 is selected at step 902, the set of sounds is again generated and this in turn results in the data structure of FIG. 11 being populated by sound sample R2. Samples continue to be collected for all output frequencies at all selected test positions. Thus, a reference signal is produced for each test position.

In alternative applications in which discrete frequencies are generated and discrete samples recorded in response, a data structure may be populated by individual samples for a particular test position and the individual samples subsequently combined to produce a reference signal for that test position.

The reference signals are representative of the impulse response of the apparatus used in the empirical testing, including that of the microphone and the human subject used. Each reference signal hence provides a 'sonic signature' of the apparatus, the human subject and the acoustic event for each test position.

In a specific application, a set of reference recordings is stored for each of a plurality of different human subjects and the results of the tests are averaged.

The set of audio output sounds is played for each test position for each of the human subjects, the resulting microphone outputs are recorded, and the microphone outputs for each test position are averaged.

In some applications, a filtering process may be performed to remove certain frequencies or noise, in particular low bass frequencies such as structure borne frequencies, from the reference recordings.

FIG. 12

A further example of a temporary data structure established at step 901 as described with respect to FIG. 9 is shown in FIG. 12. The data structure of FIG. 12 stores each individual recorded sample for the output frequencies generated at each selected test position. In this example, separate audio and otoacoustic inputs are recorded.

In a specific embodiment, for the first test position L1 the set of output sounds is generated. This results in an audio sample RA1 being recorded in addition to an otoacoustic signal RO1 being recorded. The next test position is then selected at step 902 and the set of sounds is again generated. This in turn results in the data structure of FIG. 12 being populated by audio sample RA2 and otoacoustic sample RO2. Samples continue to be collected for all output frequencies at all selected test positions. The audio sample and otoacoustic sample recorded for each test position are then subsequently combined to produce a reference recording for each test position.

In alternative applications in which individual frequencies are generated and individual samples recorded in response, a data structure may be populated by individual samples of both audio and otoacoustic types for a particular test position and the individual samples of each type subsequently combined for that test position.

Again, the test recordings are representative of the impulse response of the apparatus used in the empirical testing, including that of the microphone(s) and the human subject used. The test recordings hence provide a 'sonic signature' of the apparatus, the human subject and the acoustic event.

In a specific application, a set of reference recordings is stored for each of a plurality of different human subjects and the results of the tests are averaged.

Again, a filtering process may be performed to remove certain frequencies or noise, in particular low bass frequencies such as structure borne frequencies, from the reference recordings.

FIG. 13

Figure 13:
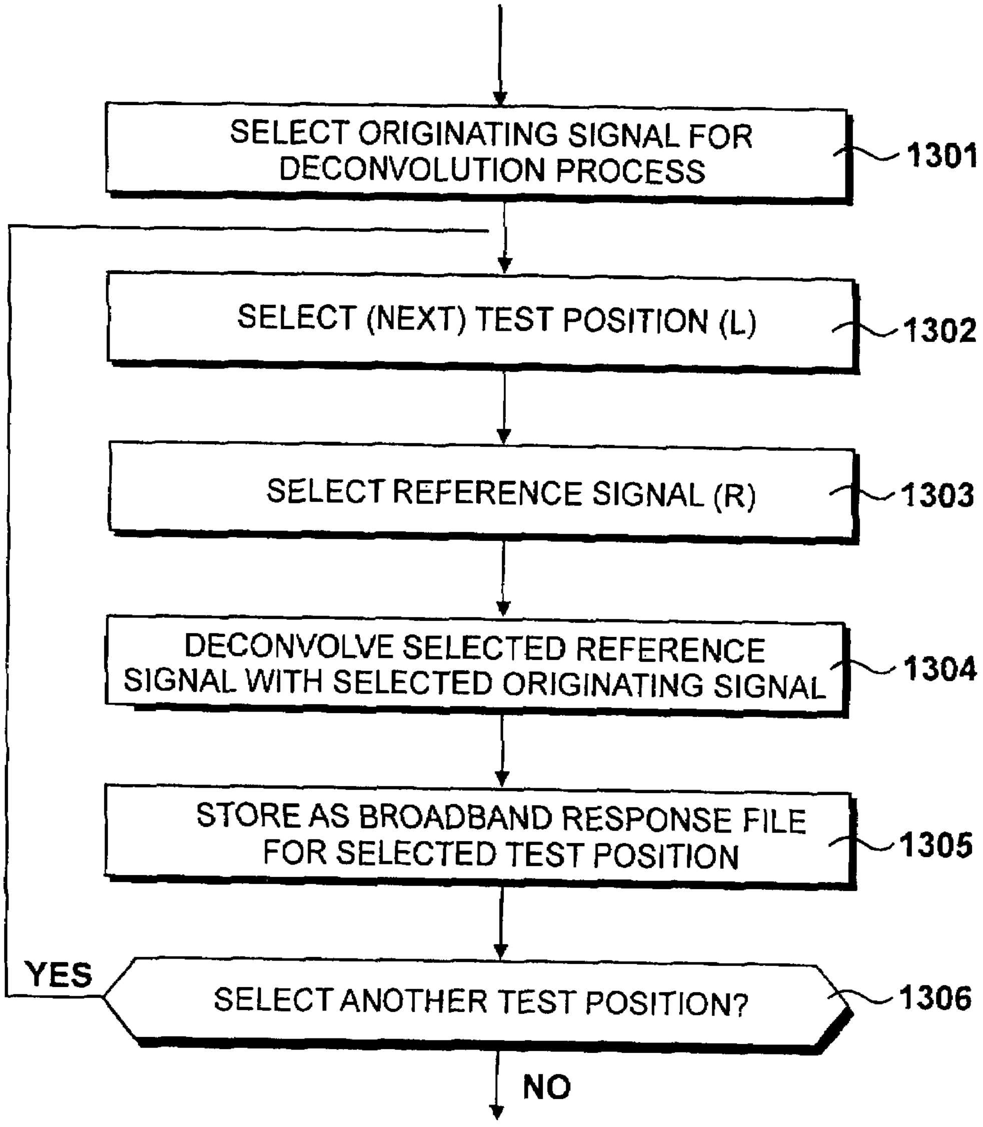
FIG. 13 shows further procedures executed by the computer system of FIG. 9 to produce broadband response files.

Finalising step 908 includes a process for deconvolving each reference signal with an originating signal to produce a broadband response file for each test position, as illustrated in FIG. 13.

At step 1301 an originating signal is selected for use in a deconvolution process.

At step 1302 a test position (L) is selected and at step 1303 an associated reference signal (R) is selected.

At step 1304 the selected reference signal (R) is deconvolved with the selected originating signal and at step 1305 the result of the deconvolution process is stored as a broadband response file for the selected test position.

Step 1306 is then entered where a question is asked as to whether another test position is to be selected. If this question is answered in the affirmative, control is returned to step 1302. Alternatively, if this question is answered in the negative, this indicates that broadband response files have been stored for each test position.

In a specific embodiment, the deconvolution process is a Fast Fourier Transform (FFT) convolution process. In alternative applications a direct deconvolution process may be used. Preferably, the broadband response files have a 28 bit or higher format. In a specific embodiment, the broadband response files have a 32 bit format.

As previously described, each broadband response file can then be used in a convolution process, to emulate an audio input signal as though it originated substantially from an indicated audio source location relative to a listening source location. As will be described further herein, broadband response files are stored for a left field and for a right field.

As described with reference to FIG. 7, data for one ear of a human subject may be derived from data produced for the other ear of the human subject. In a specific embodiment, broadband response files are produced for a first ear of the human subject only. A negative transform is then applied to each file for each of the test positions, and the resulting file is stored for the test position for the second ear that has a mirror image azimuth but the same elevation.

FIG. 14

A convolution equation 1401 is illustrated in FIG. 14. As identified, h (a recorded signal) is the result of f (a first signal) convolved with g (a second signal).

With reference to FIGS. 9 and 11, each reference signal R is a recording at a listening source location of a sound from an audio source location. With reference to convolution equation 1401, each reference signal R may be identified as h (a recorded signal) and the output sound that was recorded may be identified as f (a first signal). The second signal (g) in the convolution equation 1401 is then identified as the impulse response of the arrangement of apparatus and human subject at the test position associated with the reference signal R.

Thus, the impulse response of a reference signal R contains spatial cues relating to the relative positioning and orientation of the audio output relative to the listener.

As described previously, the production of broadband response files involves a deconvolution process. Deconvolution is a process used to reverse the effects of convolution on a recorded signal. Referring to convolution equation 1401, deconvolving h (a recorded signal) with f (a first signal) gives g (a second signal).

Thus, deconvolving a reference signal R with the output sound that was recorded functions to extract the impulse response (IR) for the associated test position. If the output sound is then convolved with the IR for a selected test position, the result will emulate the reference signal R stored for that test position.

Hence, if an audio signal is convolved with the IR for a selected test position, the result emulates the production of that audio signal from the selected test position. In this way it is possible to emulate the production of the audio signal from a specified audio source location relative to a listening source location.

FIG. 15

Figure 15:
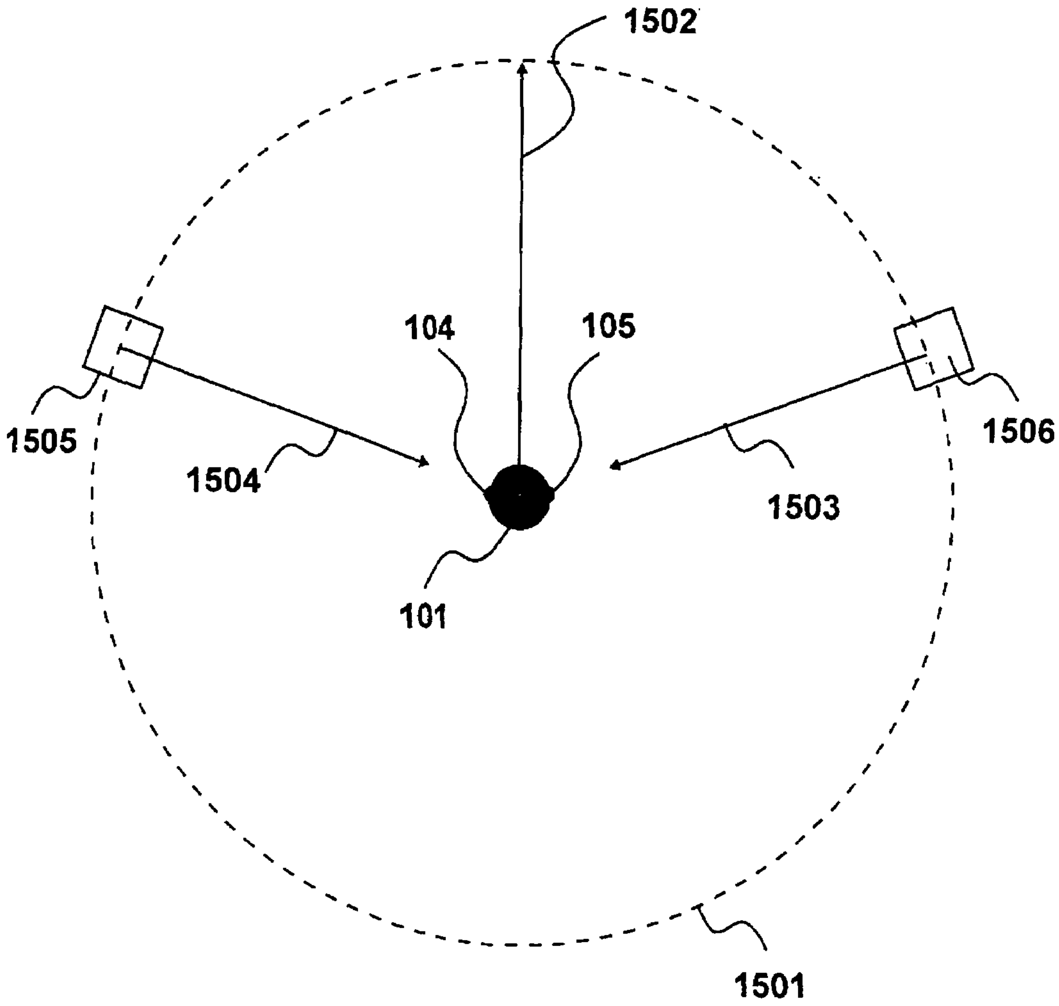
FIG. 15 illustrates a listener surrounded by an originating region from which sounds may be heard.

FIG. 15 illustrates a listener 101 surrounded by a notional three-dimensional originating region 1501, from which listener 1501 may hear a sound.

The listener is positioned at the centre of the originating region 1501, facing in a direction indicated by arrow 1502, which is identified as zero (0) degrees azimuth. The left ear 104 and the right ear 105 are at the height of the centre of the originating region 1501, which is identified as zero (0) degrees elevation.

According to the convention used herein, positive degrees azimuth increment in the clockwise direction from the zero (0) degrees azimuth position and negative degrees azimuth increment in the anticlockwise direction from the zero (0) degrees azimuth position.

It is considered that generally the best angle of acceptance of sound by the right human ear is at plus seventy (+70) degrees azimuth, zero (0) degrees elevation, indicated by arrow 1503. Similarly, it is considered that generally the best angle of acceptance of sound by the left human ear is minus seventy (−70) degrees azimuth, zero (0) degrees elevation indicated by arrow 1504. At these angles, the received sound is considered to be at its loudest, and least cluttered from reflections around the head.

Thus, if using a single pair of audio loudspeakers to output a stereo audio signal (having a left field and a right field) it would be considered of benefit to the listener to position a left audio loudspeaker 1505 at minus seventy (−70) degrees azimuth and a right audio loud speaker 1506 at plus seventy (+70) degrees azimuth.

As previously described, if an audio signal is convolved with the IR for a selected audio source location relative to a listening source location, the result emulates the production of that audio signal from the selected audio source location.

It may therefore by considered desirable to use an impulse response (IR) file that includes spatial transfer functions but that does not include spatial transfer functions for a speaker location relative to the listener location. This is because the speaker will physically contribute spatial transfer functions to the output sound. Hence, if the audio signal is convolved with an IR file containing spatial transfer functions for the speaker location relative to the listener location, the resulting sound will incorporate the spatial transfer functions for the speaker location twice.

However, it may also be considered undesirable to use an impulse response (IR) file that includes spatial transfer functions but that does not include spatial transfer functions for a speaker location relative to the listener location. This is because if an audio signal is to be convolved with the IR file for that position, and the spatial transfer functions for that position are not available, the result will be an unprocessed audio signal.

In addition, in the convolution process, it is desirable to use an impulse response (IR) file that includes spatial transfer functions but that does not include apparatus transfer functions. Again, this is because the speaker arrangement will physically contribute apparatus transfer functions to the output sound. Hence, if the audio signal is convolved with an IR file containing apparatus transfer functions, the resulting sound will incorporate both the transfer functions of the IR file and the apparatus transfer functions of the apparatus through which the processed audio signal is physically output.

It is found that using a 'frequency sweep' as described with reference to FIG. 10 as the audio output to be recorded provides a deconvolved broadband impulse response signal with a good signal to noise ratio. This is desirable, since any signal convolved with the broadband response signal will inherit the characteristics of that broadband signal.

FIG. 16

Figure 16:
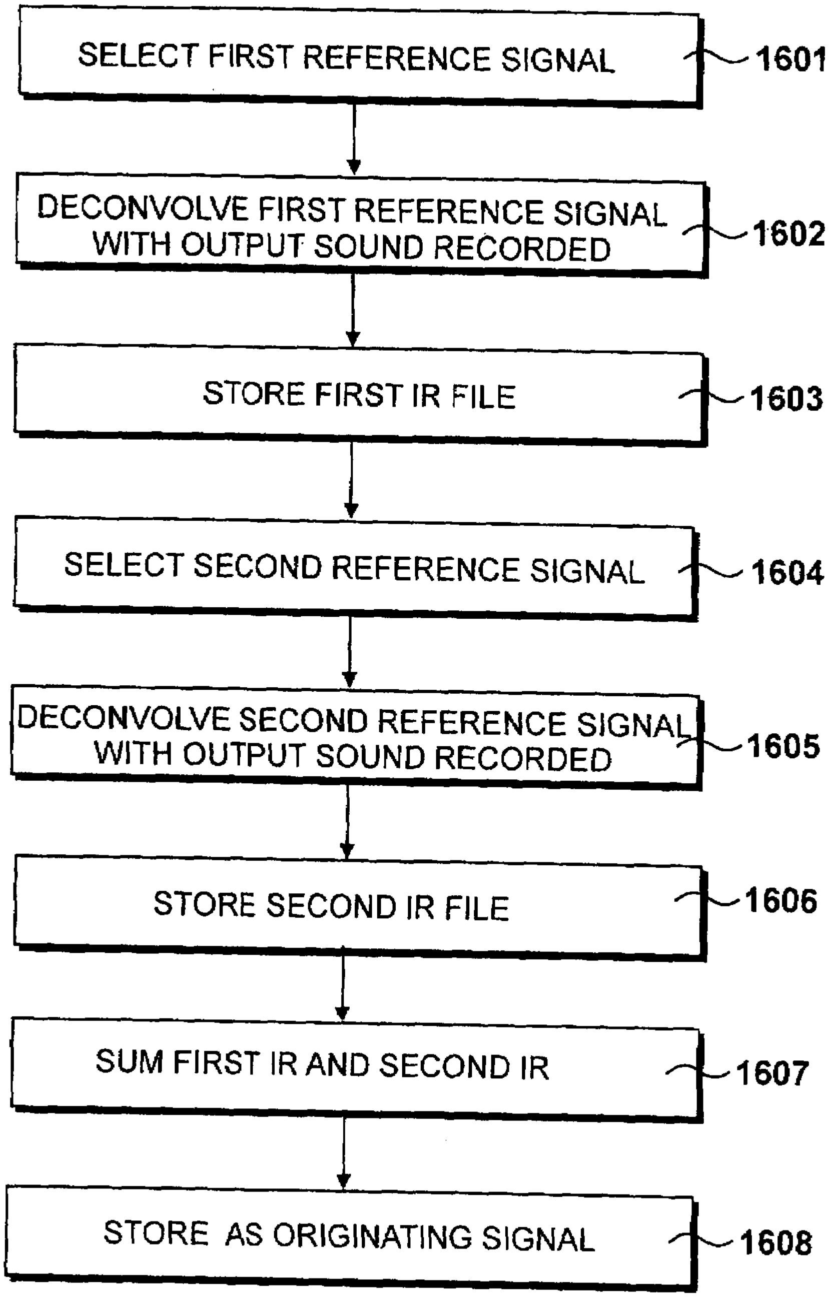
FIG. 16 shows further procedures executed by the computer system of FIG. 9 to produce broadband response files.

Procedures executed in a method of producing an originating signal for selection at step 1301 of FIG. 13 are illustrated in FIG. 16.

At step 1601, a first reference signal from the data set of reference signals R stored for a first ear of the human subject is selected. At 1602, the first selected reference signal is deconvolved with the output sound that was recorded. The resultant (IR) signal is then stored at step 1603 as a first IR file.

Step 1604 is then entered at which a second reference signal from the data set of reference signals R stored for a first ear of the human subject is selected. At 1605, the second selected reference signal is deconvolved with the output sound that was recorded. The resultant (IR) signal is then stored at step 1606 as a second IR response file.

At step 1607, the first and second IR response files are combined and the resulting signal is stored at step 1608 as an originating signal file. In a specific embodiment, Fourier coefficient data stored for each of the first and second IR response files is averaged, in effect producing data for a single signal waveform.

In a specific embodiment, the duration of each broadband response file is approximately three (3) milliseconds.

In an alternative embodiment, the signals of the first and second IR response files are summed, in effect producing two overlaid signal waveforms. However, when a 'frequency sweep' as described with reference to FIG. 10 is recorded, the length of the audio output is such that the human subject may move and hence the waveforms from the first and second reference signals may not align properly when summed.

As described with reference to FIG. 13, each reference signal in the data set for a first ear of the human subject is then deconvolved with the selected originating signal to produce a broadband response file for each test position.

By deconvolving each reference signal with an originating signal derived from at least one reference signal, the apparatus transfer functions are removed from the resulting IR signal, leaving the desired spatial transfer functions.

By deconvolving each reference signal with an originating signal derived from two reference signals, the resulting IR signal for each of the selected reference signals will incorporate spatial transfer functions derived from the other selected reference signal. Thus, if an audio signal is convolved with an IR file containing spatial transfer functions for a speaker location relative to the listener location, the audio signal will still be processed.

In a specific embodiment, the selected reference signals in the left field are those at minus thirty (−30) degrees azimuth, zero (0) elevation and minus one hundred and ten (−110) degrees azimuth, zero (0) elevation. In the right field, the selected reference signals are those at plus thirty (+30) degrees azimuth, zero (0) elevation and plus one hundred and ten (+110) degrees azimuth, zero (0) elevation.

It is found that the brain will tend to process sounds coming from these positions to produce a phantom image from plus seventy (+70) degrees azimuth, zero (0) degrees elevation for the right ear at minus seventy (−70) degrees azimuth, zero (0) degrees elevation for the left ear.

FIG. 17

Figure 17:
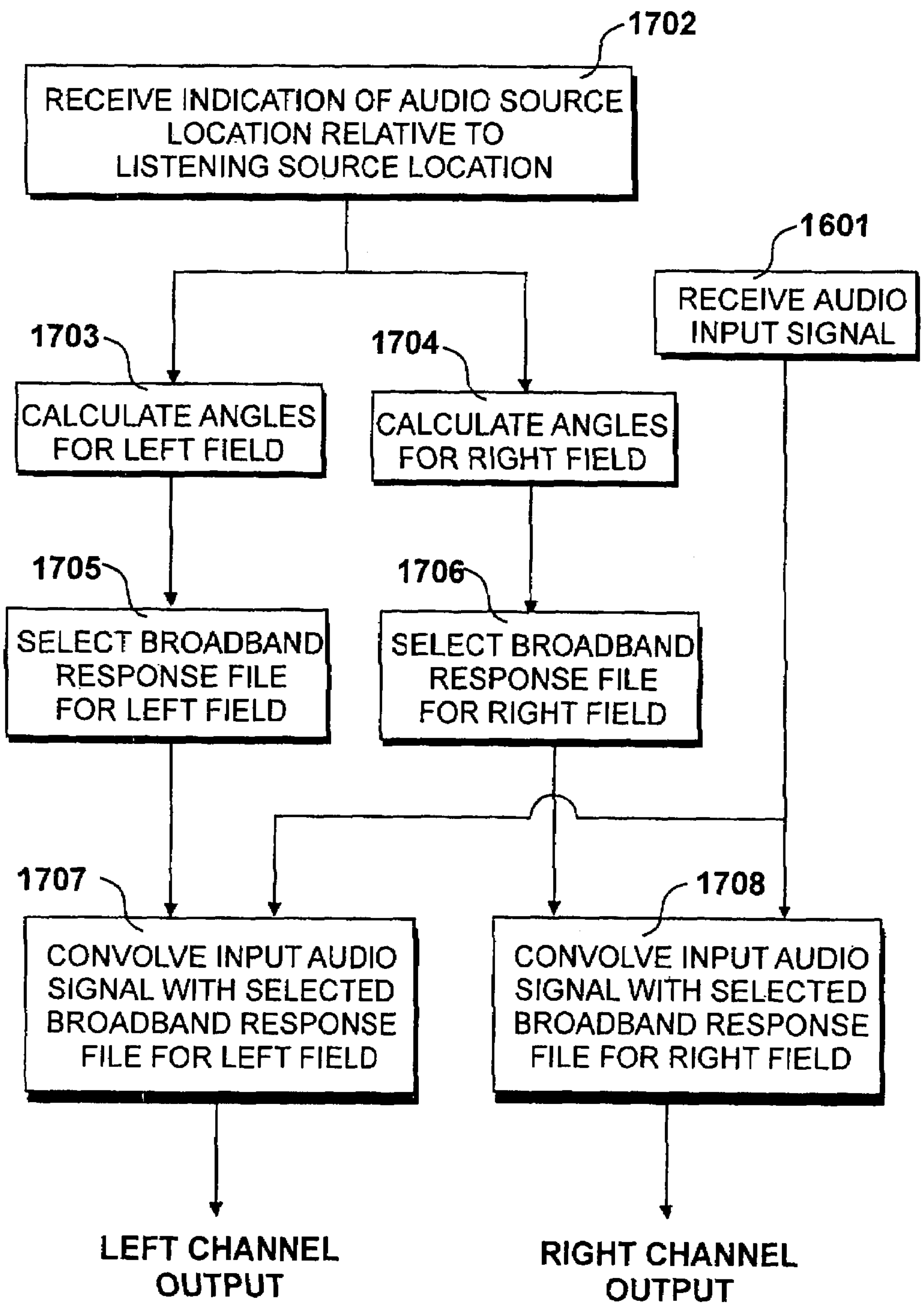
FIG. 17 shows procedures executed in a method of processing an audio input signal in combination with a broadband response file.

Procedures executed in a method of processing an audio input signal represented as digital samples to produce a stereo output signal (having a left field and a right field) that emulates the production of the audio signal from a specified audio source location relative to a listening source location are illustrated in FIG. 17.

It can be seen that a first processing chain performs operations in parallel with a second processing chain to provide inputs for first and second convolution processes to produce left and right channel audio outputs.

At step 1701, an audio input signal is received. The audio input signal may be a live signal, a recorded signal or a synthesised signal.

At step 1702, an indication is received of an audio source location relative to a listening source location. The indication may include azimuth, elevation and radial distance co-ordinates or X, Y, and Z axis co-ordinates of the sound source location and the listening location. Thus, this step may include the application of a transform to identify co-ordinates in one co-ordinate system to co-ordinates in another co-ordinate system.

At step 1703, the angles for the left field are calculated for the indication input at 1702 and at step 1703 the angles for the right field are similarly calculated for the indication input at 1701.

Step 1705 is entered from step 1703 at which a broadband response file is selected for the left field. Similarly, step 1706 is entered from step 1704 at which a broadband response file is selected for the right field.

Step 1707 is entered from step 1705, where the audio input signal is convolved with the broadband response file selected for the left field and a left channel audio signal is output. Similarly, step 1708 is entered from step 1706, where the audio input signal is convolved with the broadband response file selected for the right field and a right channel audio signal is output.

It is to be appreciated that independent convolver apparatus is used for the left and right field audio signal processing.

In a specific embodiment, the convolution process is a Fast Fourier Transform (FFT) convolution process. In alternative applications a direct convolution process may be used. In a specific embodiment, the duration of each broadband response file is approximately six (6) milliseconds.

The processing operations function to produce dual mono outputs that reproduce the natural stereo hearing of a human being. Through the processing of reference signals in the production of the broadband response files as described with reference to FIGS. 13 to 16, it is possible to produce a signal that overcomes the perception by a listener of the origin of emulated sound as being located at speaker positions. Further, it is found that where the audio input signal has a lower bit depth than the broadband response files made available for the convolution process, desirably, the convolution process can add enhancing audio detail to the processed signal.

FIG. 18

Figure 18:
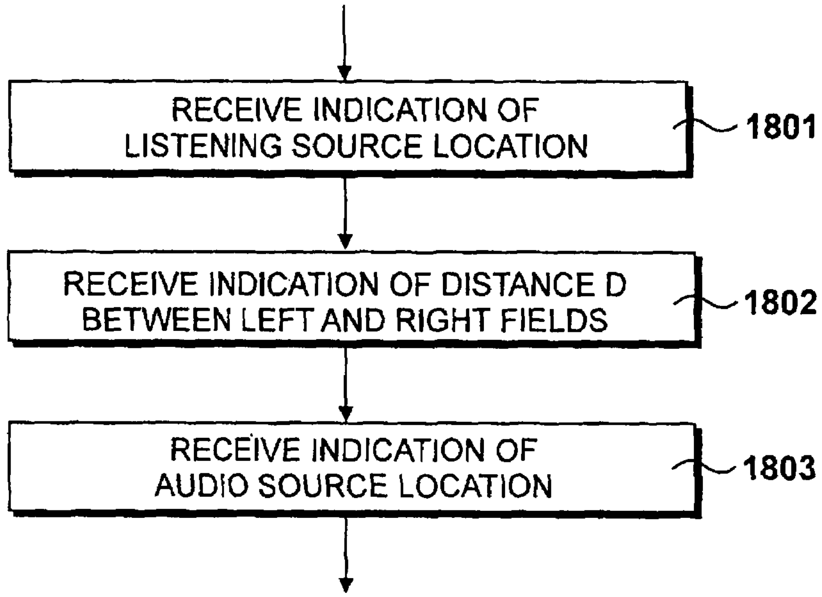
FIGS. 18 and 19 show further procedures executed in a method of processing an audio input signal in combination with a broadband response file.

Procedures executed at step 1702 of FIG. 17 are illustrated in FIG. 18.

At step 1801, an indication of the listening source location is received. Thus, both a fixed and a moving listening source location can be accommodated.

At step 1802, an indication is received of the distance D between the left fields and right fields of the listening source. As described with reference to FIG. 7, distance D relates to the distance between the left and right ears of the human subject. This may be user definable to account for different listeners.

At step 1803, an indication is received of the audio source location.

FIG. 19

Figure 19:
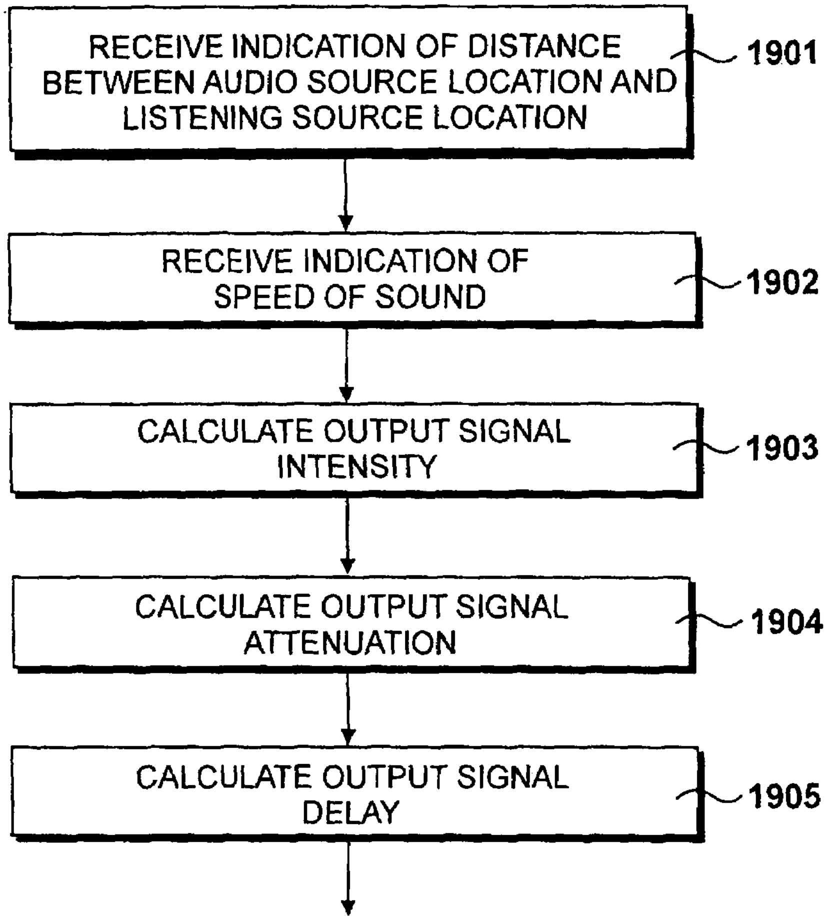

Further procedures executed in a method of processing an audio input signal represented as digital samples to produce a stereo output signal (having a left field and a right field) that emulates the production of the audio signal from a specified audio source location relative to a listening source location are illustrated in FIG. 19.

It is desirable to adjust characteristics of the processed output audio signals according to movement of the emulated sound source towards or away from the listener.

At step 1901, an indication of the relative distance between the audio source location and the listener source location is received.

At step 1902, an indication of the speed of sound is received. The speed of sound may be user definable.

The intensity of the output signal is calculated at step 1903. It is desirable to increase the volume of the processed output signal as the emulated sound source moves towards the listening source location and to decrease the volume of the processed output signal as the emulated sound source moves away from the listening source location.

At step 1904, a degree of attenuation of the processed output signal is calculated. The closer the audio source location to the listener, the less an audio signal would be attenuated as a result of passing through the medium of air, for example. Therefore, the closer the audio source location to the listener, the less the degree of attenuation applied to the processed output signal.

At step 1905, a degree of delay of the actual outputting of the processed audio signal is calculated. The delay is dependent upon the distance between the audio source location and the listener source location and the speed of sound of the medium through which the audio wave is travelling. Thus, the closer the audio source location to the listener, the less the audio signal would be delayed. The delay is applied to the processing of the associated convolver apparatus, such that the number of convolutions per second is variable.

FIG. 20

Figure 20:
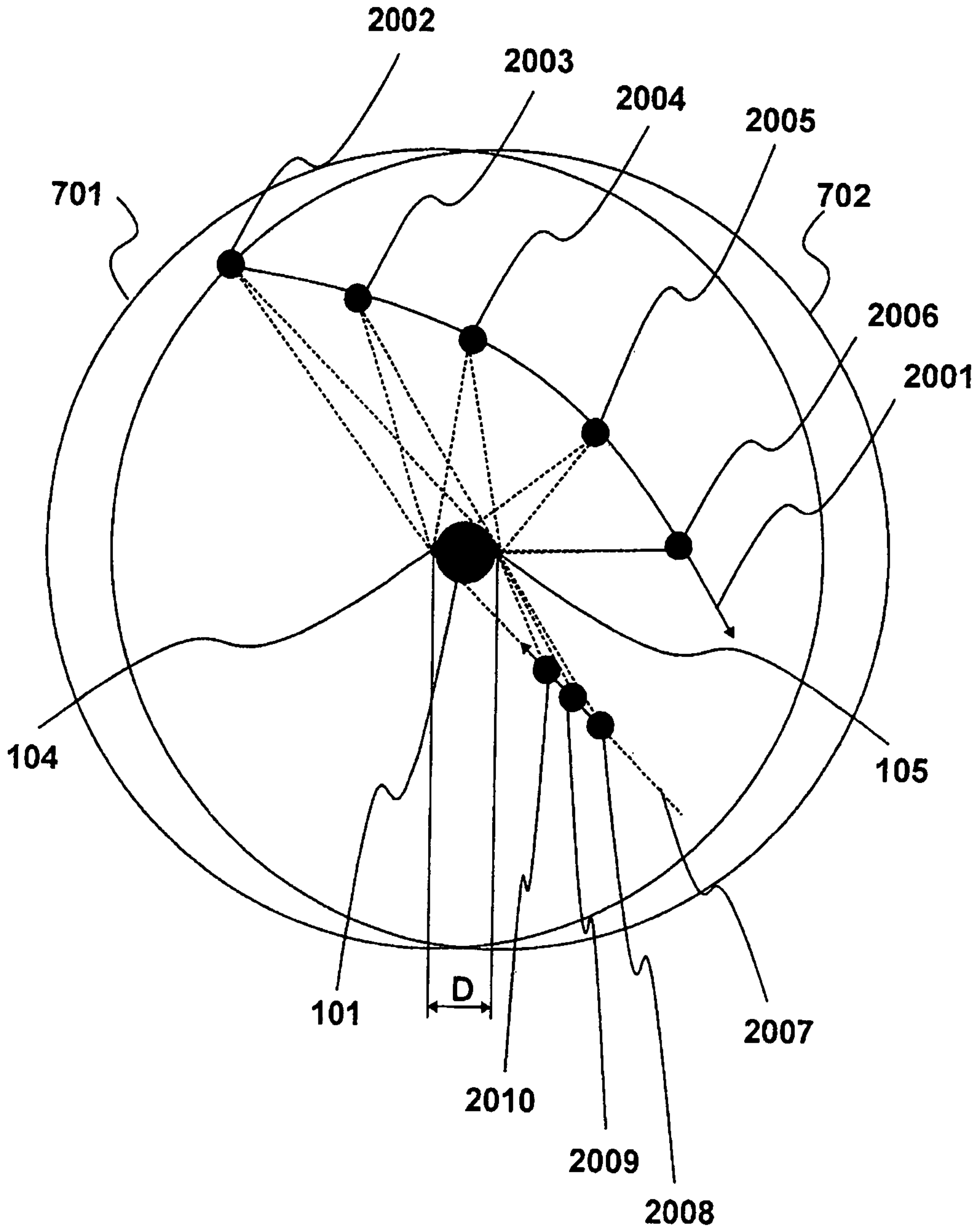
FIG. 20 illustrates a sound emulating the production of an audio input signal from a moving source.

The plan view illustration of FIG. 20 shows human subject 101 with their left ear 104 at the centre of a left region 701 and their right ear 105 at the centre of a right region 702.

A first moving emulated sound source is indicated generally by arrow 2001. It can be seen that the angles and distance of the audio output source relative to the left and right ears 104, 105 of the listener 101 vary as the sound source moves through spatial points 2002 to 2006 in the direction of arrow 2001. Thus, it can be seen that angles and distance of the audio output source relative to the left and right ears 104, 105 of the listener 101 at point 2004 are both different to those at point 2005.

A second moving emulated sound source is indicated generally by arrow 2007. It can be seen that the angles and distance of the audio output source relative to the left and right ears 104,105 of the listener 101 vary as the sound source moves through spatial points 2008 to 2010 in the direction of arrow 2007. In this example, it can be seen that both the angle and distance of the audio output source relative to the right ear 105 of the listener vary between points, however, only the distance and not the angle of the audio output source relative to the left ear 104 of the listener 101 varies between points.

By processing the audio signal as described above, in particular with reference to FIG. 19, with reference to the distance of the output source and the speed of sound, it is possible to reproduce a natural Doppler effect of the moving sound.

FIG. 21

Figure 21:
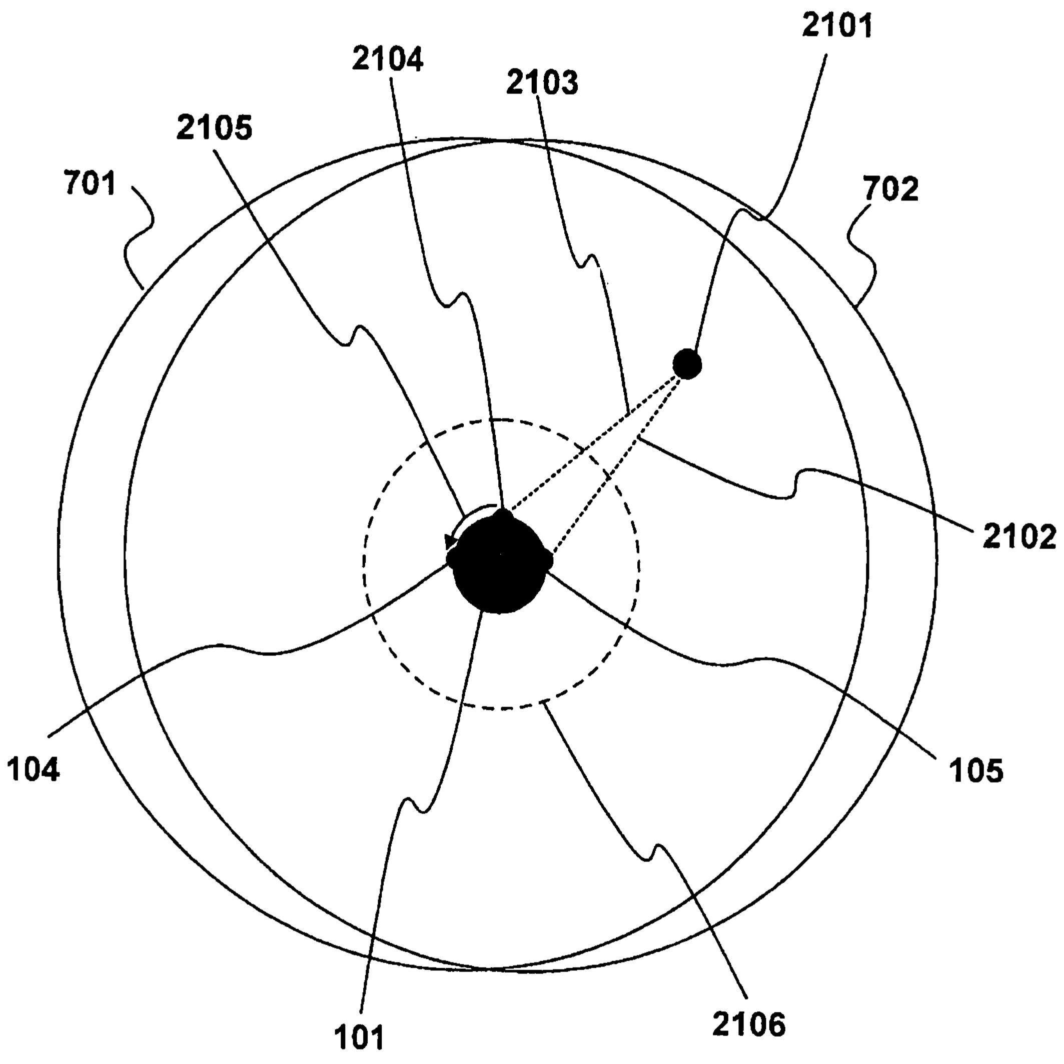
FIG. 21 illustrates a sound emulating the production of an audio input signal from an audio source location.

FIG. 21 is also a plan view of human subject 101 with their left ear 104 at the centre of a left region 701 and their right ear 105 at the centre of a right region 702.

An emulated sound source 2101 is shown, to the right side of human subject 101. The angle of the sound source 2101 relative to the right ear 105 of the human subject 101 is such that the path 2102 from the sound source 2101 to the right ear 105 is directly incident upon the right ear 105. In contrast, the angle of the sound source 2101 relative to the left ear 104 of the human subject 101 is such that the path 2103 from the sound source 2101 to the left ear 104 is indirectly incident upon the left ear 105. It can be seen that the path 2103 is incident upon the nose 2104 of the human subject 101. However, sound may travel from the nose 2104 around the head, as illustrated by arrow 2105, to the left ear 104.

The difference in arrival time of sound between two ears is known as the interaural time difference and is important in the localisation of sounds as it provides a cue to the direction of sound source from the head. An interval between when a sound is heard by the ear closest to the sound source and when the sound is heard by the ear furthest from the sound source can be dependent upon sound travelling around the head of a listener.

The head of a human subject may be modelled and data taken from the model may be utilised in order to enhance the reality of the perception of the emulated origin of processed audio. From the data model, it is possible to determine the distance of the path between the ears around the front of the head and also around the rear of the head, and also the distance between the nose and each of the left and right ears. Further, using the data model of the human subject, it is possible to determine whether the path of sound from a specified location to be emulated is directly or indirectly incident upon an ear of the human subject.

Referring to step 1702 of FIG. 17, an indication is received regarding the audio source location relative to the listening source location. In a specific embodiment, a procedure may be performed to identify whether the audio source location is indirectly incident upon an ear of the human subject at the listening source location. In the event that the sound path is determined to be indirectly incident upon the ear of interest, an adjustment is made to the distance indication between that ear and the audio source location to include an additional distance related to the sound travelling a path around the head. The magnitude of the additional distance is determined on the basis that the incident sound will travel the shortest physical path available from the point of incidence with the head to the subject ear.

In a specific embodiment, a scanning operation is performed to map the dimensions and contours of the head of each human subject in detail.

As described, a particular position may be selected as the source of a perceived sound by selecting the appropriate broadband response signal. A further technique may be employed in order to adjust this perceived distance of the sound, that is to say, the radial displacement from the origin.

In a specific embodiment, a procedure is performed to determine whether the audio source location is closer than a threshold radial distance 2106 from the ears of the listener at the listening source location. In the event that the audio source location is determined to be within a predetermined distance from the listening source location, the ear that is closest to the audio source location is identified. A component of unprocessed audio signal is then introduced into the channel output for the closest ear, whilst processing for the channel output for the other (furthest) ear remains unmodified. The closer the audio source location is identified to be to the closest ear, the greater the component of unprocessed audio signal is introduced into the channel output for that ear. In effect, cross fading is implemented to achieve a particular ratio of processed to unprocessed sound.

FIG. 22

As illustrated in FIG. 22, broadband response files may be derived for each test position for different materials and environments.

The apparatus illustrated in FIG. 5 may be used to produce a plurality of broadband response files for each test position. The procedures detailed above for the production of a set of broadband response files using a human subject may be repeated replacing the human subject with a particular material or item. The resultant broadband response files are hence representative of the impulse response of the material or environment.

In a specific embodiment, an audio microphone is placed at the centre of the arc of gantry 505. A sound absorbing barrier is placed at a set distance from the microphone, between the microphone and the speaker unit 501. The subject material is then placed between the sound absorbing barrier and the speaker unit 501. The resultant broadband response files are thus representative of the way each material absorbs and reflects the output audio frequencies.

In a specific embodiment, an audio microphone is placed at the centre of the arc of gantry 505. Items of different materials and constructions are then placed around the microphone and the above detailed procedures performed to produce corresponding broadband response files.

In this way, a library of broadband response files for different materials and environments may be derived and stored. The stored files may then be made available for use in a method of processing an audio input signal to produce a stereo output signal that emulates the production of the audio signal from a specified output source location relative to a listening source location region.

Thus, for example, location L1 may have a stored broadband response file derived from empirical testing involving a human subject, resulting in broadband response file B1, brick, resulting in broadband response file B1B and grass, resulting in broadband response file B1G, for example. Similarly, broadband response files B3, B3B and B3G stored are stored for location L3.

Broadband response files may be derived from empirical testing involving one or more of, and not limited to: brick; metal; organic matter including wood and flora; fluids including water; interior surface coverings including carpet, plasterboard, paint, ceramic tiles, polystyrene tiles, oils, textiles; window glazing units; exterior surface coverings including slate, marble, sand, gravel, turf, bark; textiles including leather, fabric; soft furnishings including cushions, curtains.

FIG. 23

Figure 23:
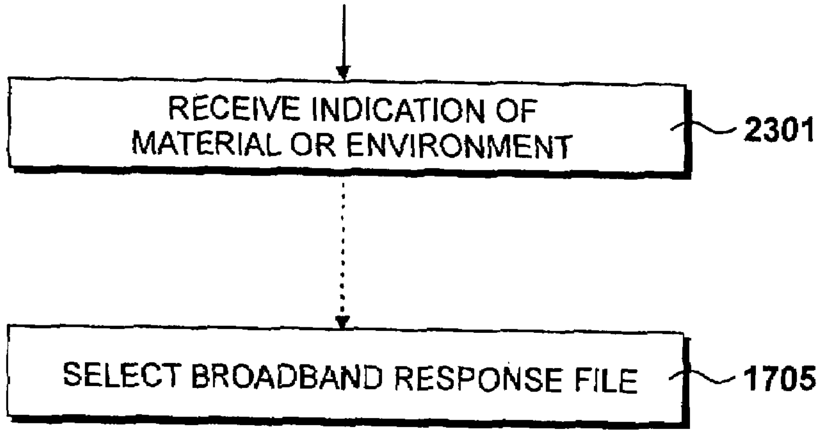
FIG. 23 shows a further procedure executed in a method of processing an audio input signal in combination with a broadband response file.

Procedures executed to produce a stereo output signal (having a left field and a right field) that emulates the production of the audio signal from a specified audio source location relative to a listening source location may therefore take into account a material or environment, as indicated in FIG. 23.

At step 2301, an indication of the environment is received. Broadband response files associated with a particular material or environment may have one more attributes associated therewith, for example indicating an associated speed of sound.

Such a library of broadband response files may be used to create the illusion of an audio environment according to a displayed scenario within a video gaming environment, for example. In this way, different virtual audio environments may be established.

An environment may be modelled and data taken from the model may be utilised in order to enhance the reality of the perception of the emulated origin of processed audio. From the data model, it is possible to determine whether sound is reflected from different surfaces. In the event that early reflections from different surfaces are identified, it is possible to perform convolution operations with broadband response files selected to correspond to the different surfaces. This is found to be of particular assistance in the identification of the height and front-back spatial placement of sound by a listener, for which interaural time differences play less of a part than for left-right spatial placement of sound.

Both spatial cues and material or environment cues may be incorporated in a broadband response file. Hence, in a specific embodiment, a single convolution is performed to convolve the audio input with a broadband response file including both spatial and material or environment cues.

In an alternative process, however, a first convolution is performed to convolve the audio input signal with a spatial broadband response file and a second convolution is performed to convolve the audio input signal with a material broadband response file.

Comparing the former and latter approaches, the processing time to perform a single convolution is quicker than the processing time to perform two separate convolutions. However, more memory is utilised to make available broadband response files including both spatial and material or environment cues than to make available broadband response files including material or environment cues along with to broadband response files including spatial cues.

In a specific embodiment, broadband response files are stored with searchable text file names. The text file name preferably includes an indication of the associated location in an originating region and a prefix or suffix to indicate the associated environment or material. Thus, at steps 1705 and 1706 of FIG. 17, a scanning procedure is performed to locate the appropriate broadband response file for selection.

FIG. 24

Figure 24:
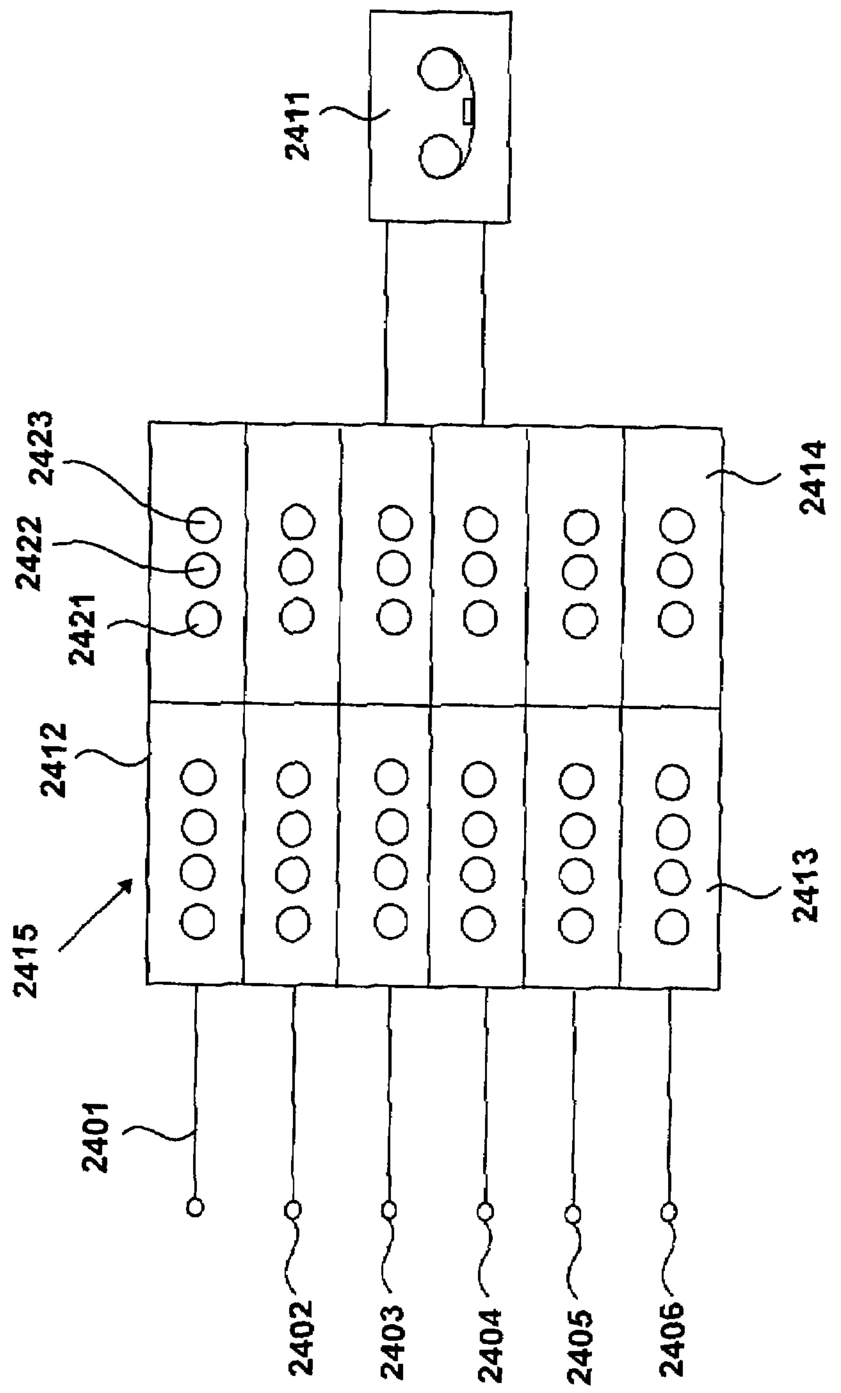
FIG. 24 illustrates a first example of a facility configured to make use of broadband response files.

An example of a facility configured to make use of broadband response files, in order to simulate sound sources appearing in a three-dimensional space, is illustrated in FIG. 24. FIG. 24 represents an audio recording environment in which live audio sources are received on input lines 2401 to 2406. The audio signals are mixed and a stereo output is supplied to a stereo recording device 2411. An audio mixer 2412 has a filtering section 2413 and a spatial section 2414. For each input channel, the audio filtering section 2413 includes a plurality of controls illustrated generally as 2415 for the channel associated with input 2401. These include volume controls (often provided in the form of a slider) along with tone controls, typically providing parametric equalisation.

The spatial control area 2414 replaces standard stereo sliders or a rotary pan control. As distinct from positioning an audio source along a stereo field (essentially a linear field) three controls exist for each input channel. Thus, concerning input channel 2401 a first spatial control 2421 is included with a second spatial control 2422 and a third spatial control 2423. In an embodiment, the first spatial control 2421 may be used to control the perceived distance of the sound radially from the notional listener. The second control 2422 may control the pan of the sound around the listener and the third control 2423 may control the angular pitch of the sound above and below the listener. In addition to these controls, a visual representation may be provided to a user such that the user may be given a visual view of where the sound should appear to originate from.

FIG. 25

Figure 25:
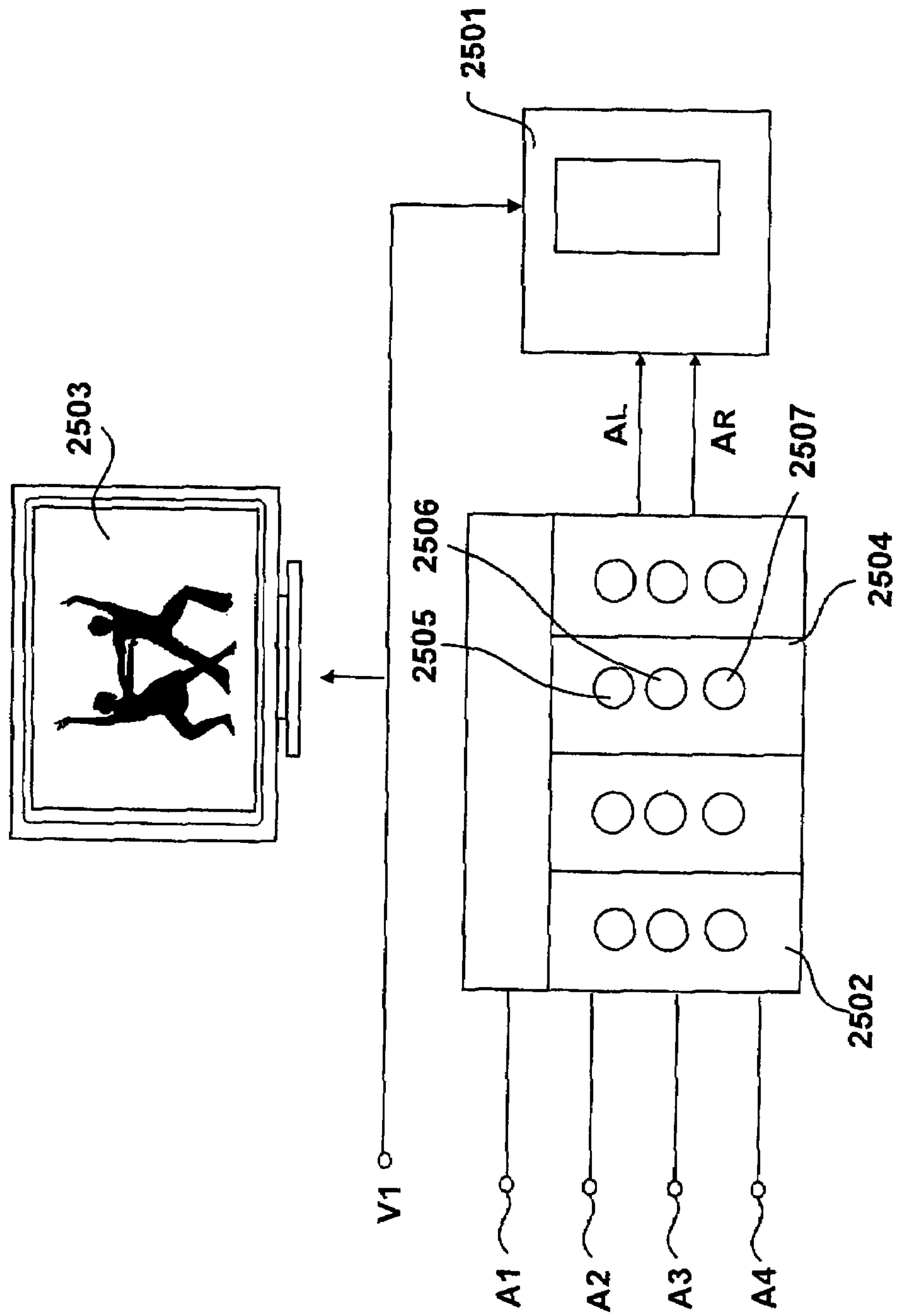
FIG. 25 illustrates a second example of a facility configured to make use of broadband response files.

An alternative facility where spatial mixing may be deployed is illustrated in FIG. 25. The environment of FIG. 25 represents cinematographic or video editing suite that includes a high definition video recorder 2501.

In this example, a video signal has been edited and a video input on input line V1 is supplied to the video recorder 2501. The video recorder 2501 is also configured to receive an audio left and an audio right signal from an audio mixing station 2502.

At the audio mixing station, video being supplied to the video recorder 2501 is displayed to an editor on a visual display 2503. Four audio signals are received on audio input lines A1, A2, A3 and A4. Each has a respective mixing channel and at each mixing channel, such as the third channel 2504 there are provided three spatial controls 2505, 2506 and 2507. These controls provide a substantially similar function to those described (as 2421, 2422 and 2423) in FIG. 24. Thus, they allow the perceived source of the sound to be moved in three-dimensional space.

In the environment of FIG. 24, the positioning of sound has few constraints and is left to the creativity of the mixer. However, in the environment of FIG. 25, it is likely that audio inputs will be associated with recorded talent. Thus, an editor may view screen 2503 in order to identify the locations of said talent and thereby adjust the perceived location of the sound so as to co-ordinate the perceived sound location with that of the location of talent viewed on screen 2503.

FIG. 26

Figure 26:
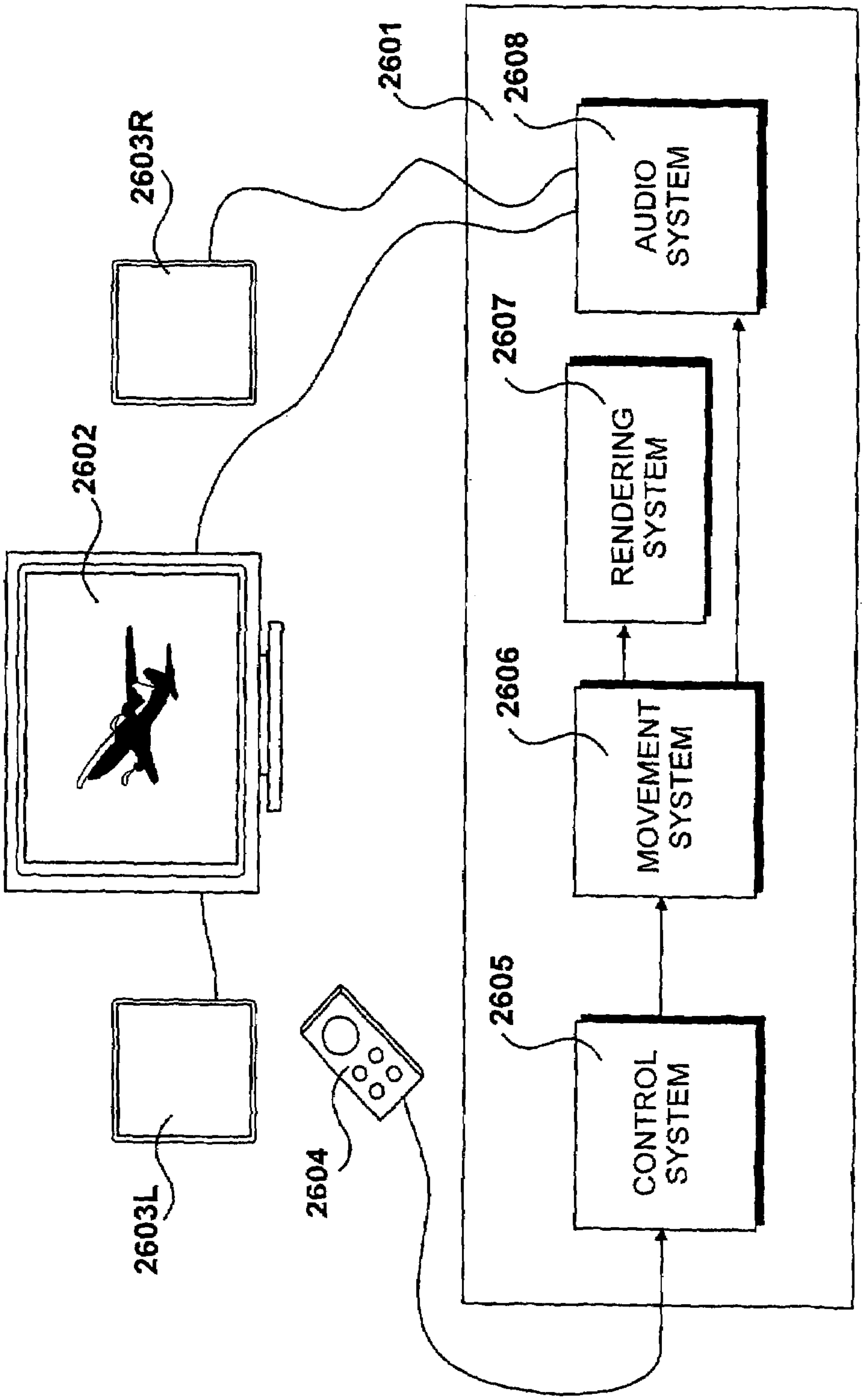
FIG. 26 illustrates a third example of a facility configured to make use of broadband response files.

An alternative facility for the application of the techniques described herein is illustrated in FIG. 26. FIG. 26 represents a video gaming environment having a processing device 2601 that, structurally, may be similar to the environment illustrated in FIG. 8. However, for the purposes of illustration, operations of the processing environment 2601 are shown functionally in FIG. 26.

An image is shown to someone playing a game via a display unit 2602. In addition, stereo loudspeakers 2603L and 2603R supply stereo audio to the person playing the game. The game is controlled by a hand held controller 2604, that may be of a conventional configuration. The hand controller 2604 (in the functional environment disclosed) supplies control signals to a control system 2605. The control system 2605 is programmed with the operationality of the game itself and generally maintains the movement of objects within a three-dimensional environment, while retaining appropriate historical data such that the game may progress and ultimately reach a conclusion. Part of the operation of the control system 2605 will be to recognise the extent to which images must be displayed on the monitor 2602 and provide appropriate three-dimensional data to a movement system 2606.

Movement system 2606 is responsible for providing an appropriate display to the user as illustrated on the display unit 2602 which will also incorporate appropriate audio signals supplied to the loudspeakers 2603L and 2603R. Thus, a three-dimensional world space is converted into a two-dimensional view, which is then rendered at a rendering system 2607 in order to provide images to the visual display 2602. In combination with this, movement system 2606 also provides movement data to an audio system 2608 responsible for generating audio signals. The audio system 2608 includes synthesising technology to generate audio output signals. In addition, it also receives three-dimensional positional data from the movement system 2606 such that, by incorporating the techniques disclosed herein, it is possible to place an object within a three-dimensional perceived space. In this way, it is possible for the reality of the game to be enhanced given that sounds may appear as if emanating from a broader spectrum other than from a straight-forward stereo audio field. The listening source location may be identified as that of the player of a game or an avatar within the game, for example.

FIG. 27

Figure 27:
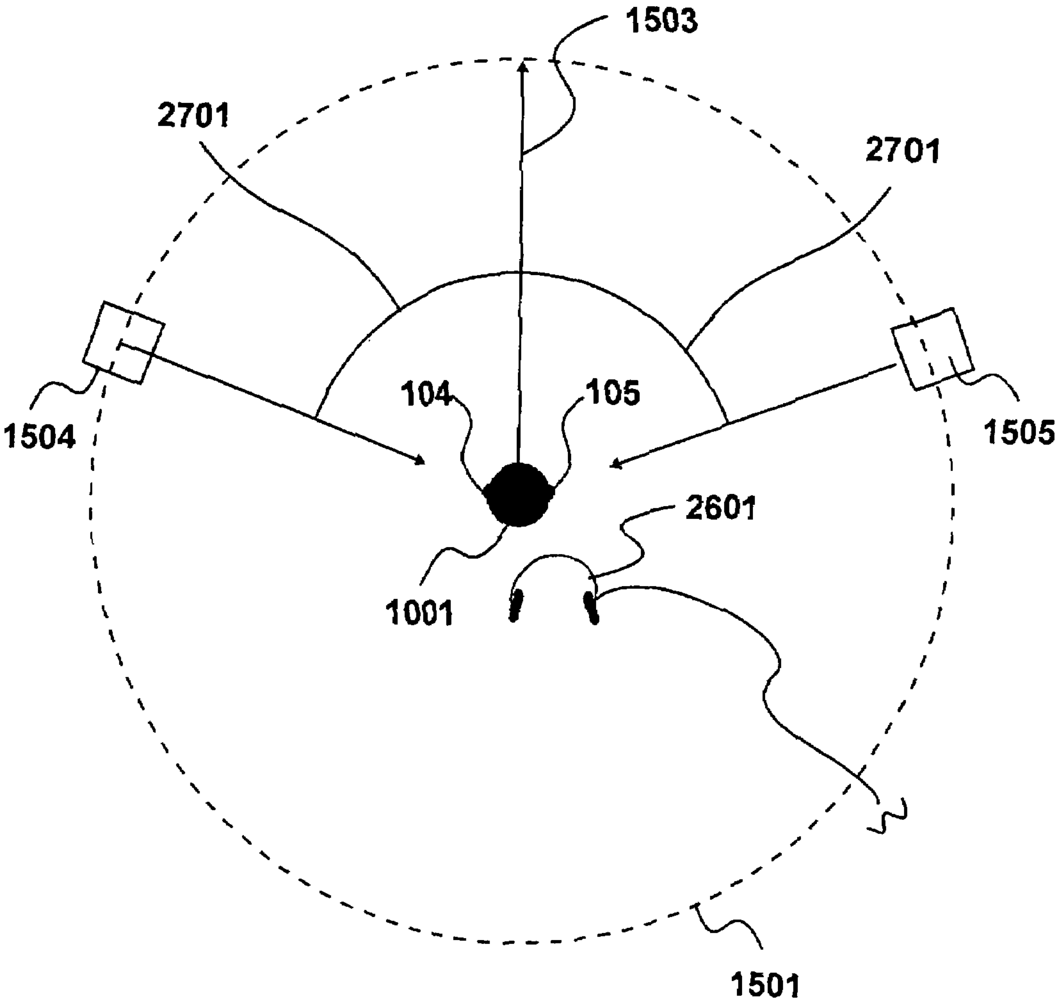
FIG. 27 shows a first arrangement of loudspeakers.

FIG. 27 illustrates listener 101 positioned at the centre of the notional three-dimensional originating region 1501.

In the example, of FIG. 27, listener 101 is positioned between left audio loudspeaker 1504 and right audio loudspeaker 1505. When facing forward, indicated by arrow 1503, the position of each of the speakers 1504, 1505 makes an angle 2701 of between sixty-five (65) and seventy-five (75) degrees, preferably substantially seventy (70) degrees, in azimuth from the forward direction in which the listener 101 is facing. As previously described, the positions of substantially plus seventy (+70) degrees and minus seventy (−70) degrees in azimuth from the forward direction are considered to output sound at generally the best angle of acceptance for the human ears.

In a specific embodiment, the spatial cues from sound outputted at the positions of substantially plus seventy (+70) degrees and minus seventy (−70) degrees in azimuth from the forward direction are deconvolved from the broadband response files such that they are introduced by the speakers 1504, 1505. This has the effect for the listener of the stereo output sound being disconnected form the speaker positions. Thus, an emulated sound is not identified as coming from the speaker positions. Hence, from the perspective of the listener, this effect increases the reality of the perception of the origin of the emulated sound.

In a specific embodiment, loudspeakers are located at positions having a common radial distance from the centre of the originating region.

The processed stereo output signal may be received through a pair of headphones, such as stereo headphones 2702. It is found that when stereo headphones are used to receive a processed stereo output signal there is negligible difference in the overall perception of the origin of the emulated sound from when the same processed stereo output signal is received through the speakers 1504, 1505. Thus, the techniques described herein enable a stereo output signal having independent left and rights fields to be produced that is perceived by a listener as the same sound whether the sound is output from stereo speakers or from stereo headphones.

FIG. 28

In the environment of FIG. 26, the technique for generating three-dimensional sound position is being deployed and the sounds are being produced while the deployment takes place. This differs from the environments of FIGS. 24 and 25 where the techniques are being deployed to generate the three-dimensional effects while the resulting sounds are being recorded for later reproduction.

In environments where the sounds are to be reproduced for a group of people (such as a sound recording) or for a larger audience, as in the case of a cinematographic film, it is preferable for measures to be taken to ensure that the audience obtain maximum benefit from the processed sound.

Figure 28:
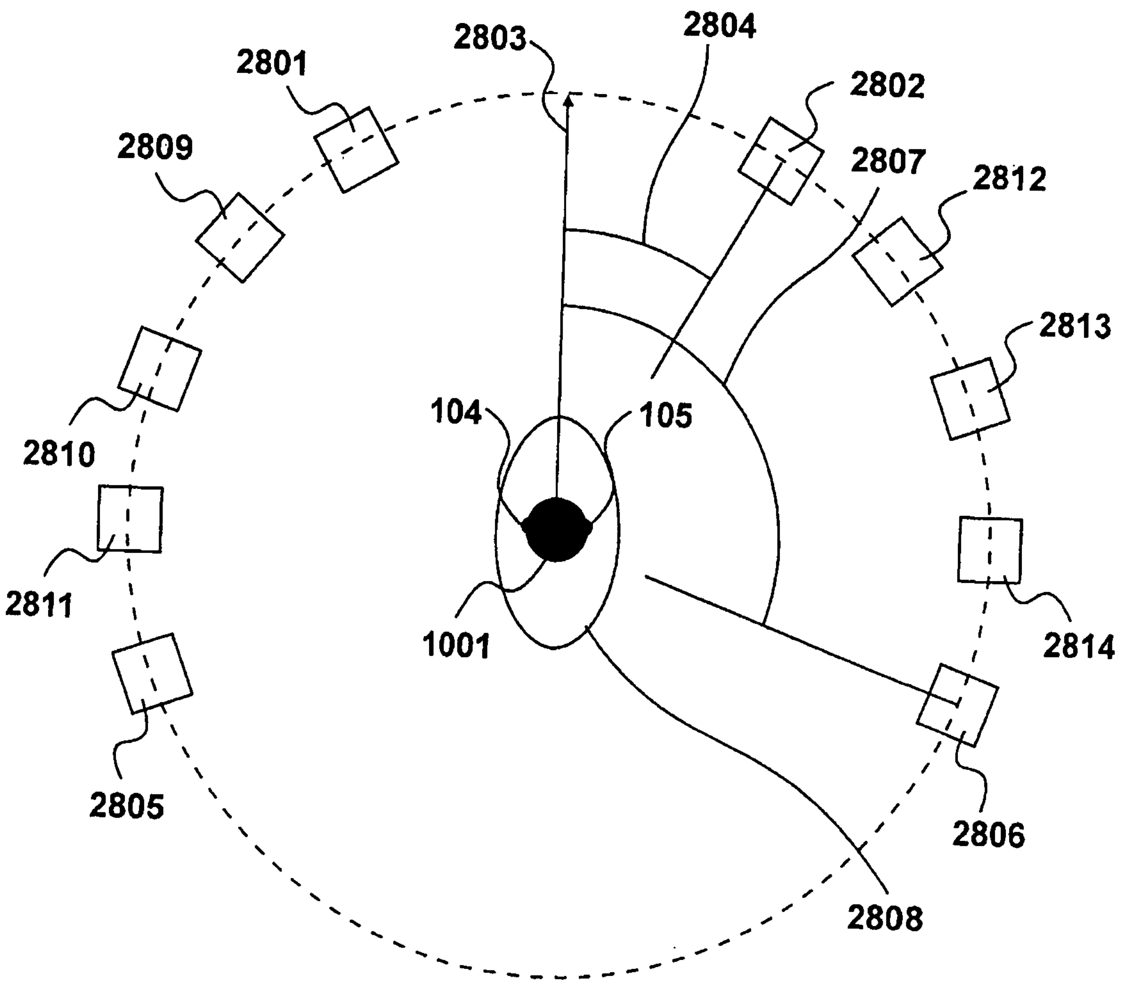
FIG. 28 shows a second arrangement of loudspeakers.

In the example of FIG. 28, a front left audio loudspeaker 2801 is provided along with a front right audio loudspeaker 2802. When facing forward, indicated by arrow 2803, the position of each of the speakers 2801, 2802 makes an angle 2804 of between twenty-five (25) and thirty-five (35) degrees, preferably substantially thirty (30) degrees, in azimuth from the forward direction in which the listener 101 is facing.

In addition, to enhance the stereo effect, rear speakers are provided, consisting of a left rear speaker 2805 and a right rear speaker 2806.

When facing forward, as illustrated in FIG. 28, the position of each rear speaker 2805, 2806 makes an angle 2807 of between one hundred and five (105) degrees and one hundred and fifteen (115) degrees, preferably substantially one hundred and ten (110) degrees, from the forward direction in which the listener is facing.

Left speakers 2801 and 2805 both receive the left channel signal and right speakers 2802 and 2806 both receive the right channel signal. Thus, the stereo channel signals provided to the front speakers 2801 and 2802 is duplicated for the rear speakers 2805 and 2806.

Thus, by the provision of four (4) loudspeakers in preference to two (2) loudspeakers, a region 2808 is defined such that when located in this region substantially all of the stereo and three-dimensional effects are perceived. In this way it is possible to increase the size of the “sweet spot” of the audio field. Such an approach is considered to be particularly attractive when reliance is being made on very high frequencies and otoacoustics in order to enhance the three-dimensional effect.

When facing forward, as illustrated in FIG. 28, the listener 101 perceives the sound as originating from a location between the front and rear speakers. As previously described, with the front speakers located at minus thirty (−30) degrees and plus thirty (+30) degrees and the rear speakers located at minus one hundred and ten (−110) degrees and plus one hundred and ten (+110) degrees as described, the listener perceives a ‘phantom image’ of the sound as generally originating from locations at substantially minus seventy (−70) degrees and plus seventy (+70) degrees.

The stereo channel signals provided to the front speakers 2801 and 2802 may be duplicated for each additional pair of speakers utilised in an application.

As indicated in FIG. 28, additional left audio loudspeakers 2809 to 2811 may be located between the front and rear right audio speakers 2801, 2805 whilst additional right audio loudspeakers 2812 to 2814 may be located between the front and rear right audio speakers 2802, 2806. It is found that the acoustic energy from these additional speakers does not affect the perception of a ‘phantom image’ of the sound as generally originating from locations at substantially minus seventy (−70) degrees and plus seventy (+70) degrees.

As indicated, the stereo output signal can be physically output through a single pair of speakers or through multiple pairs of speakers.

In an arrangement having a plurality of pairs of loudspeakers the left and right channels of the stereo signal are duplicated for the second and each additional pair of speakers.

If four (4) discrete audio channels are available, the left channel signal is duplicated for a second left speaker and similarly the right channel signal is duplicated for a second right speaker.

This is contrast to 4-2-4 processing systems that derive four (4) streams of information from two (2) input streams of information. In such systems, the two (2) input audio streams are used to directly feed left and right channels. Further processing is performed upon the audio streams to identify identical signals that are in phase, which are used to drive a third centre channel, and to identify identical signals in each stream that are out of phase, which are used to drive a fourth surround channel.

In movie theatres, the centre channel is often used to feed a centre speaker, which serves to anchor the output sound to the movie screen, whilst the surround channel is used to feed a series of displaced speakers, intensity panning along the series of speakers utilised in order to emulate the production of a moving sound source.

It is found that incorporating spatial cues into stereo output signals (having a left field and a right field) as described herein provides a better perceived panorama of sound than that achieved by intensity panning.

Further, as previously described, spatial cues may be incorporated into the stereo output signals as described herein may be used to provide or remove anchoring effects in sounds emulating the production of said audio signal from a specified audio source location relative to a listening source location.

The processing performed to extract information to drive the centre and surround channels results in loss of fidelity and quality of the output audio signals.

By incorporating spatial cues into stereo output signals (having a left field and a right field) as described herein, the desired emulation of the production of said audio signal from a specified audio source location relative to a listening source location may be achieved more efficiently. The effect may be achieved through the use of a single pair of speakers. However, where the left and right channels are used to derive further channels, the duplication of channels results in improved fidelity and quality of sound, again using the additional channels efficiently to enhance the stereo effect.

In Dolby Digital 5.1® and DTS Digital Sound® systems, six (6) discrete audio channels are encoded onto a digital data storage medium, such as a CD or film. These channels are then split up by a decoder and distributed for playing through an arrangement of different speakers.

Thus, the left and right channels of stereo output signals produced as described herein may be used to feed six (6) or more audio channels such that existing hardware using such systems may be used to reproduce the audio signals.

The invention claimed is:

1. A method comprising reproducing a stereo output signal having a left field and a right field and represented as digital samples, said stereo signal emulating the production of an audio signal from a virtual audio source location relative to a listening location, said listening location having a left listening position and a right listening position corresponding to the left and right ears of a typical listener; said method using audio playback equipment comprising a first input device, a second input device, a plurality of displaced left field loudspeakers and a plurality of displaced right field loudspeakers; and said method further comprising the steps of:

receiving by said first input device a left channel signal and a right channel signal; produced by convolving an audio input signal with a left field broadband response file selected from a plurality of stored files derived from empirical testing and describing the impulse response of a left ear to a sound emitted from said indicated location;

playing said left channel signal through each of said plurality of displaced left field loudspeakers; and playing said right channel signal through each of said plurality of displaced right field loudspeakers;

wherein said left channel signal and said right channel signal are produced by way of the following process:

receiving an audio input signal, an indication of the virtual audio source location, and an indication of the distance between the left listening position and the right listening position;

determining said left and right listening positions, based on said listening location and said indication of distance determining a first direction from said indicated location to said left listening position and a second direction from said indicated location to said right listening position, wherein the indicated location is manually indicated or indicated in response to operation performed within a computer game;

selecting a left field broadband response file describing the impulse response of a left ear to a sound emitted from said first direction;

selecting a right field broadband response file describing the impulse response of a right ear to a sound emitted from said second direction;

convolving said audio input signal with said selected left field response file to produce the left channel signal;

convolving said audio input signal with said selected right field response file to produce the right channel signal.

2. A method according to claim 1, wherein said audio input signal is a live signal, a recorded signal or a synthesised signal.

3. A method according to claim 1, wherein said left channel signal is duplicated for each of said plurality of displaced left field loudspeakers and said right channel signal is duplicated for each of said plurality of displaced right field loudspeakers.

4. A method according to claim 1, wherein said plurality of loudspeakers includes an arrangement of loudspeakers located relative to said listening location, at which:

the forward facing direction of a listener at said listening location is identified as being at zero (0) degrees azimuth, and said arrangement of loudspeakers includes:

a first left loudspeaker positioned at minus thirty (−30) degrees azimuth, a second left loudspeaker positioned at minus one hundred and ten (−110) degrees azimuth, a first right loudspeaker positioned at plus thirty (+30) degrees azimuth, and a second right loudspeaker positioned at plus one hundred and ten (+110) degrees azimuth.

5. A method according to claim 1, wherein said plurality of broadband response files stored for at least one of said left field and said right field are produced by a method comprising the steps of:

locating a human subject in an anechoic chamber such that the left ear or the right ear respectively is at the centre of an originating region, locating an audio microphone adjacent the ear canal of the left ear or the right ear respectively of said human subject, locating a sound source in said anechoic chamber, playing an audio output for each of a plurality of test positions, said audio output including a plurality of frequencies, the co-ordinates of said test positions are identified by:

a common radial distance from the centre of the originating region, degrees elevation from the centre of the originating region, said centre determined to be at zero (0) degrees elevation, and degrees azimuth from a predetermined position at zero (0) degrees elevation;

recording the resulting microphone output for each test position, deriving a reference signal for each test position from said microphone output recorded for each test position, deriving an originating signal from at least one reference signal, and deconvolving the reference signal for each test position with said originating signal to produce a broadband response file for each test position for said first ear.

6. A method according to claim 5, wherein said originating signal is derived by a method comprising the steps of:

selecting a first reference signal derived from said microphone output recorded for the test position at minus thirty (−30) degrees azimuth, zero (0) degrees elevation or plus thirty (+30) degrees azimuth, zero (0) degrees elevation respectively, deconvolving said first reference signal with said audio output to produce a first impulse response signal, selecting a second reference signal from said microphone output recorded for the test position at minus one hundred and ten (−110) degrees azimuth, zero (0) degrees elevation or plus one hundred and ten (+110) degrees azimuth, zero (0) degrees elevation respectively, deconvolving said second reference signal with said audio output to produce a second impulse response signal, and combining said first impulse response signal and said second impulse response signal to produce said originating signal.

7. A method according to claim 5, wherein a broadband response file is stored for at least 770 test positions for each of said first ear and the other second ear of the human subject.

8. A method according to claim 5, wherein a plurality of broadband response files is stored for each test position, each of the plurality of broadband response files for a test position relating to a different subject material or environment.

9. A method according to claim 5, wherein said audio output from said sound source at least one sound having a frequency greater than twenty (20) kilohertz.

10. Apparatus for reproducing a stereo output signal having a left field and a right field and represented as digital samples, said stereo signal emulating the production of an audio signal from a virtual audio source location relative to a listening location, said listening location having a left listening position and a right listening position corresponding to the left and right ears of a typical listener;

the apparatus comprising a first input device, a second input device, a processing device, a plurality of displaced left field loudspeakers and a plurality of displaced right field loudspeakers, wherein: said first input device is configured to receive a left channel signal and a right channel signal; said processing device is configured to distribute said left channel signal for playback through each of said plurality of displaced left field loudspeakers, and distribute said right channel signal for playing through each of said plurality of displaced right field loudspeakers;

wherein said left channel signal and said right channel signal are produced by way of the following process:

receiving an audio input signal, an indication of the virtual audio source location, and an indication of the distance between the left listening position and the right listening position;

determining said left and right listening positions, based on said listening location and said indication of distance;

determining a first direction from said indicated location to said left listening position and a second direction from said indicated location to said right listening position, wherein said indicated location is manually indicated or indicated in response to operations performed within a computer game;

selecting a left field broadband response file describing the impulse response of a left ear to a sound emitted from said first direction;

selecting a right field broadband response file describing the impulse response of a right ear to a sound emitted from said second direction:

convolving said audio input signal with said selected left field response file to produce the left channel signal;

convolving said audio input signal with said selected right field response file to produce the right channel signal.

11. Apparatus according to claim 10, wherein said audio input signal is a live signal, a recorded signal or a synthesised signal.

12. Apparatus according to claim 10, wherein said left channel signal is duplicated for each of said plurality of displaced left field loudspeakers and said right channel signal is duplicated for each of said plurality of displaced right field loudspeakers.

13. Apparatus according to claim 10, wherein said plurality of loudspeakers includes an arrangement of loudspeakers located relative to a listening position, at which:

the forward facing direction of the listener is identified as being at zero (0) degrees azimuth, and said arrangement of loudspeakers includes:

a first left loudspeaker positioned at minus thirty (−30) degrees azimuth, a second left loudspeaker positioned at minus one hundred and ten (−110) degrees azimuth, a first right loudspeaker positioned at plus thirty (+30) degrees azimuth, and a second right loudspeaker positioned at plus one hundred and ten (+110) degrees azimuth.

14. Apparatus comprising a non-transitory data storage medium having a stereo output signal having a left field and a fight field and represented as digital samples, said stereo signal emulates the production of an audio signal from a virtual audio source location relative to a listening location, said listening location having a left listening position and a right listening position corresponding to the left and right ears of a typical listener; in which a left channel signal and a right channel signal have been produced by way of a process comprising:

receiving an audio input signal, an indication of the virtual audio source location, and an indication of the distance between the left listening position and the right listening position wherein the indicated location is manually indicated or indicated in response to operations performed within a computer game;

determining said left and right listening positions, based on said listening location and said indication of distance;

determining a first direction from said indicated location to said left listening position and a second direction from said indicated location to said right listening position;

selecting a left field broadband response file describing the impulse response of a left ear to a sound emitted from said first direction:.

selecting a fight field broadband response file describing the impulse response of a right ear to a sound emitted from said second direction;

convolving said audio input signal with said selected left field response file to produce the left channel signal;

convolving said audio input signal with said selected fight field response file to produce the right channel signal.

15. A non-transitory data storage facility according to claim 14, wherein:

said left channel signal is duplicated for distribution for playback through each of a plurality of displaced left field loudspeakers, and said right channel signal is duplicated for distribution for playback through each of a plurality of displaced right field loudspeakers.

16. A non-transitory data storage facility according to claim 14, wherein said audio input signal is a live signal, a recorded signal or a synthesised signal.

* * * * *

UNITED STATES PATENT AND TRADEMARK OFFICE

CERTIFICATE OF CORRECTION

PATENT NO. : 8,688,249 B2
APPLICATION NO. : 11/787937
DATED : April 1, 2014
INVENTOR(S) : Christopher David Vernon It is certified that error appears in the above-identified patent and that said Letters Patent is hereby corrected as shown below:

Title Page,

Item (73) Assignee, should read:

Sontia Logic Limited

Item (30) Foreign Application Priority Data, should read:

Apr. 19, 2006 (GB) ..........................0607707.7
Aug. 23, 2006 (GB) ..........................0616677.1

Signed and Sealed this
Eleventh Day of November, 2014

Michelle K. Lee

Michelle K. Lee
*Deputy Director of the United States Patent and Trademark Office*